(12) United States Patent
Suzuki et al.

(10) Patent No.: US 8,159,573 B2
(45) Date of Patent: Apr. 17, 2012

(54) PHOTOELECTRIC CONVERSION DEVICE AND IMAGING SYSTEM

(75) Inventors: Satoshi Suzuki, Hiratsuka (JP); Akira Okita, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 716 days.

(21) Appl. No.: 12/327,851

(22) Filed: Dec. 4, 2008

(65) Prior Publication Data

US 2009/0147117 A1     Jun. 11, 2009

(30) Foreign Application Priority Data

Dec. 5, 2007    (JP) ................................ 2007-315211

(51) Int. Cl.
H04N 3/14      (2006.01)
H04N 5/335     (2006.01)
H01L 27/00     (2006.01)

(52) U.S. Cl. ................... 348/294; 348/308; 250/208.1

(58) Field of Classification Search ................ 348/294, 348/308; 250/208.1; 257/290–292
See application file for complete search history.

(56) References Cited

U.S. PATENT DOCUMENTS

| 6,707,496 | B1 * | 3/2004 | Yang et al. ............ 348/303 |
| 6,987,685 | B2 | 1/2006 | Koizumi et al. ............ 365/63 |
| 7,187,052 | B2 | 3/2007 | Okita et al. ............ 257/444 |
| 7,199,827 | B2 | 4/2007 | Inokuma et al. ............ 348/300 |
| 7,283,305 | B2 | 10/2007 | Okita et al. ............ 359/619 |
| 7,286,170 | B2 | 10/2007 | Inui et al. ............ 348/241 |
| 7,294,818 | B2 | 11/2007 | Matsuda et al. ............ 250/208.1 |
| 7,321,110 | B2 | 1/2008 | Okita et al. ............ 250/208.1 |
| 7,408,210 | B2 | 8/2008 | Ogura et al. ............ 257/233 |
| 7,456,880 | B2 | 11/2008 | Okita et al. ............ 348/243 |
| 7,460,162 | B2 | 12/2008 | Koizumi et al. ............ 348/294 |
| 7,466,003 | B2 | 12/2008 | Ueno et al. ............ 257/462 |
| 2005/0168618 | A1 | 8/2005 | Okita et al. ............ 348/335 |
| 2005/0174552 | A1 | 8/2005 | Takada et al. ............ 355/53 |
| 2005/0179796 | A1 | 8/2005 | Okita et al. ............ 348/308 |
| 2005/0253947 | A1 | 11/2005 | Kim et al. ............ 348/308 |
| 2005/0259167 | A1 | 11/2005 | Inoue et al. ............ 348/300 |
| 2006/0043393 | A1 | 3/2006 | Okita et al. ............ 257/93 |
| 2006/0157759 | A1 | 7/2006 | Okita et al. ............ 257/292 |
| 2006/0158539 | A1 | 7/2006 | Koizumi et al. ............ 348/300 |
| 2006/0208292 | A1 | 9/2006 | Itano et al. ............ 257/292 |
| 2007/0205439 | A1 | 9/2007 | Okita et al. ............ 257/228 |
| 2008/0273093 | A1 | 11/2008 | Okita et al. ............ 348/220.1 |
| 2009/0033781 | A1 | 2/2009 | Okita et al. ............ 348/308 |

FOREIGN PATENT DOCUMENTS

JP    2004-153682  A    5/2004
(Continued)

*Primary Examiner* — Scott J Sugarman
(74) *Attorney, Agent, or Firm* — Fitzpatrick, Cella, Harper & Scinto

(57) ABSTRACT

A photoelectric conversion device includes a pixel array in which a plurality of pixels including a photoelectric conversion unit are arrayed, a first storage unit and second storage unit which store pixel signals read out from the pixel array, a first read switch which reads out the pixel signal stored in the first storage unit to a first common signal line, a second read switch which reads out the pixel signal stored in the second storage unit to a second common signal line, and a third read switch which has an input terminal electrically connected to the output terminal of the second storage unit, and an output terminal electrically connected to the output terminal of the first read switch, and reads out the pixel signal stored in the second storage unit to the first common signal line.

8 Claims, 13 Drawing Sheets

FOREIGN PATENT DOCUMENTS

| | | |
|---|---|---|
| JP | 2004-153705 A | 5/2004 |
| JP | 2005-020483 A | 1/2005 |
| JP | 2005-086260 A | 3/2005 |
| JP | 2005-318601 A | 11/2005 |
| JP | 2005-333462 A | 12/2005 |
| JP | 2006-229581 A | 8/2006 |

* cited by examiner

BLOCK DIVISION DRIVING PULSE

PHOTOELECTRIC CONVERSION DEVICE AND IMAGING SYSTEM

BACKGROUND OF THE INVENTION

1. Field of the Invention

The present invention relates to a photoelectric conversion device and imaging system.

2. Description of the Related Art

These days, cameras have rapidly been digitized, and digital cameras have become popular. Digital cameras incorporate a photoelectric conversion device which photoelectrically converts an object image formed by an imaging optical system. Typical examples of the photoelectric conversion device are CCD and MOS photoelectric conversion devices. The MOS photoelectric conversion device includes a pixel array in which basic cells (pixels) including photoelectric conversion elements such as photodiodes are two-dimensionally arrayed, a capacitance unit which holds a signal from the pixel array, and a horizontal signal line for externally outputting a signal from the capacitance unit. A signal passing through the horizontal signal line is externally output from an output terminal.

Japanese Patent Laid-Open No. 2005-020483 discloses an arrangement in which a plurality of capacitive elements C1 to Cn are alternately connected to two horizontal signal lines HSL1 and HSL2 to multiplex signals passing through the two horizontal signal lines HSL1 and HSL2, as shown in FIG. 1 of Japanese Patent Laid-Open No. 2005-020483. In this arrangement, charge integrating amplifiers 14-1 and 14-2 are respectively connected to the output terminals of the two horizontal signal lines HSL1 and HSL2. Outputs from the charge integrating amplifiers 14-1 and 14-2 are alternately output to an A/D converter 16 via a multiplexer 15. According to Japanese Patent Laid-Open No. 2005-020483, one signal can be generated at a speed double the output speed of the charge integrating amplifiers 14-1 and 14-2, and input to the A/D converter 16.

Japanese Patent Laid-Open No. 2004-153705 discloses an arrangement in which odd-numbered memory cells 21 counted from the left in a line memory 20 are connected to a first horizontal signal line 22, and even-numbered memory cells 21 in the line memory 20 are connected to a second horizontal signal line 23, as shown in FIG. 1 of Japanese Patent Laid-Open No. 2004-153705. In this arrangement, a signal passing through the first horizontal signal line 22 is supplied to a first output amplifier 30a, and a signal passing through the second horizontal signal line 23 is supplied to a second output amplifier 30b. A switch 24 interposed between the first and second horizontal signal lines 22 and 23 connects them to each other in a correction mode. According to Japanese Patent Laid-Open No. 2004-153705, the signal voltage of the same pixel out of a plurality of pixels is supplied to each of a plurality of output amplifiers in the correction mode, obtaining amplifier outputs suitable for level correction.

However, according to the technique in Japanese Patent Laid-Open No. 2005-020483, sample-and-hold operation in multiplexing, that is, alternate output operation to the A/D converter 16 via the multiplexer 15 during the charge integrating operation by the charge integrating amplifiers 14-1 and 14-2 causes the waveform of a signal output to the A/D converter 16 to be distorted.

The number of output systems for outputting a signal (the number of output terminals via which a signal actually can be output) is sometimes subject to the limitation by the relationship with the outside of the photoelectric conversion device. However, the technique in Japanese Patent Laid-Open No. 2004-153705 does not disclose a read method when the number of output systems is subject to the limitation by the relationship with the outside of the photoelectric conversion device.

According to the technique described in Japanese Patent Laid-Open No. 2004-153705, signals of the same single pixel are output via different output amplifiers in the correction mode. Since the switch resistances differs between a plurality of output paths, the output signals may contain different offsets. This can cause degradation of an image such as a streak in the image.

SUMMARY OF THE INVENTION

The present invention has been made to overcome the conventional drawbacks, and provides for reducing the offsets of signals output from pixels of different columns in a pixel array when the number of output systems is subject to the limitation by the relationship with the outside of a photoelectric conversion device.

According to the first aspect of the present invention, there is provided a photoelectric conversion device comprising a pixel array in which a plurality of pixels including a photoelectric conversion unit are arrayed, a first storage unit and a second storage unit which store pixel signals read out from the pixel array, a first read switch which reads out the pixel signal stored in the first storage unit to a first common signal line, a second read switch which reads out the pixel signal stored in the second storage unit to a second common signal line, and a third read switch which has an input terminal electrically connected to an output terminal of the second storage unit, and an output terminal electrically connected to an output terminal of the first read switch, and reads out the pixel signal stored in the second storage unit to the first common signal line.

According to the second aspect of the present invention, there is provided a photoelectric conversion device having a pixel array in which a plurality of pixels including a photoelectric conversion unit are arrayed, a signal output circuit which outputs a pixel signal read out from the pixel array, the signal output circuit including a plurality of blocks each including a plurality of first storage units and a plurality of second storage units which store pixel signals read out from the pixel array, a first block common signal line to which signals are output from the plurality of first storage units, and a second block common signal line to which signals are output from the plurality of second storage units, a first common signal line to which signals are transferred from the plurality of first block common signal lines, and a second common signal line to which signals are transferred from the plurality of second block common signal lines, the photoelectric conversion device comprising a plurality of read switches, each of which has an input terminal electrically connected to an output terminal of a corresponding one of the plurality of second storage units, and an output terminal electrically connected to a corresponding one of the first block common signal lines, and reads out a pixel signal stored in a corresponding one of the plurality of second storage units to a corresponding one of the first block common signal lines.

According to the third aspect of the present invention, there is provided an imaging system comprising the above-described photoelectric conversion device, an optical system which forms an image on an imaging plane of the photoelectric conversion device, and a signal processing unit which processes a signal output from the photoelectric conversion device to generate image data.

The present invention can reduce the offsets of signals output from pixels on different columns in a pixel array when the number of output systems is limited by the relationship with the outside of a photoelectric conversion device.

Further features of the present invention will become apparent from the following description of exemplary embodiments with reference to the attached drawings.

DESCRIPTION OF THE EMBODIMENTS

Preferred embodiments of the present invention will be described in detail below with reference to the accompanying drawings. In the following description, the structures, arrangements, sizes, and the like of respective units may not be construed to limit the scope of the present invention to only them unless otherwise specified.

First Embodiment

Figure 1:
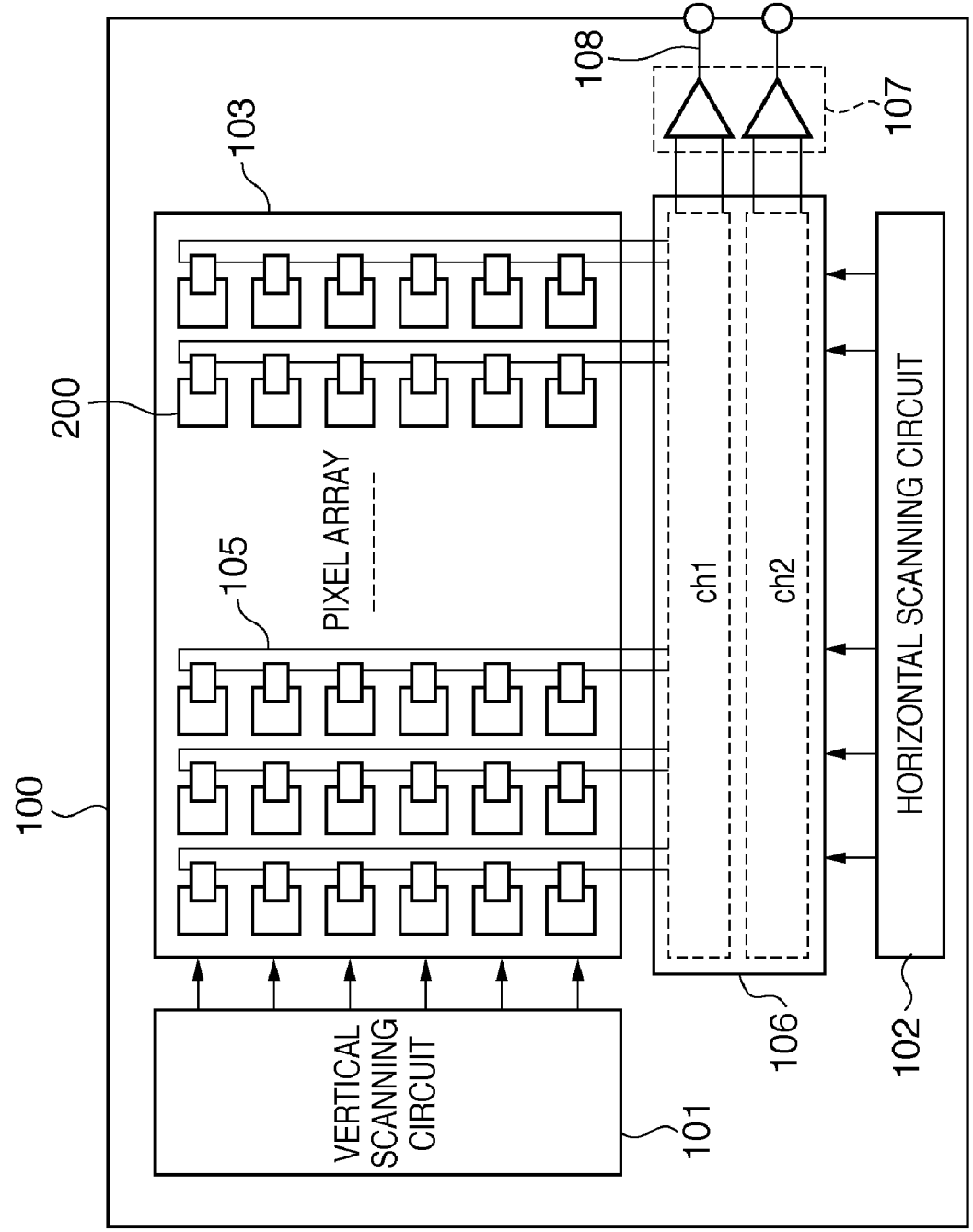
FIG. 1 is a diagram showing the arrangement of a photoelectric conversion device according to the first preferred embodiment of the present invention.
Figure 2:
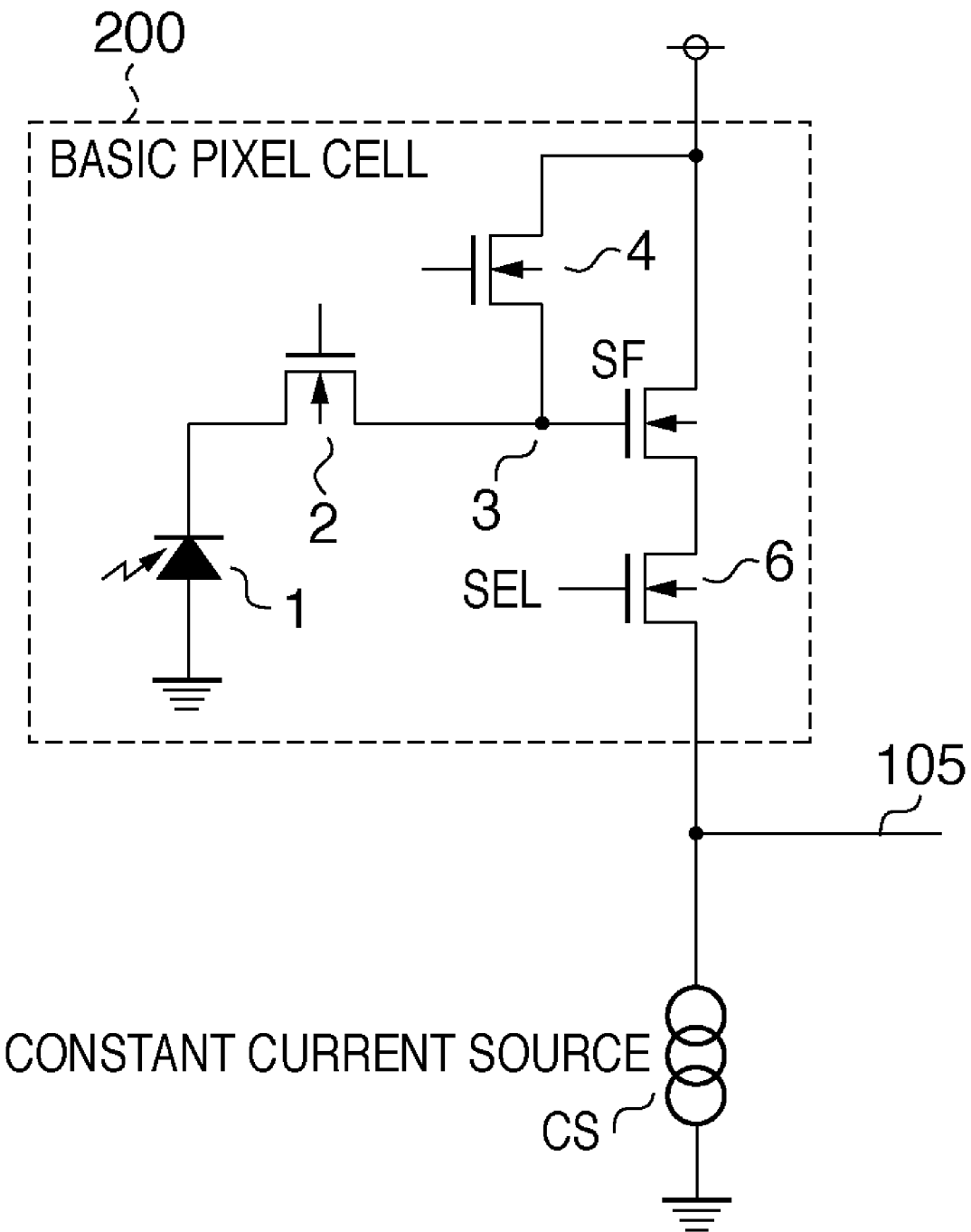
FIG. 2 is a circuit diagram of a circuit arrangement from a pixel to a vertical output line according to the first preferred embodiment of the present invention.

FIG. 1 is a diagram showing the arrangement of a photoelectric conversion device 100 according to the first preferred embodiment of the present invention. The photoelectric conversion device 100 is, for example, a CMOS image sensor. In a pixel array 103, for example, well-known basic cell pixels (to be referred to as pixels hereinafter) 200 shown in FIG. 2 are arrayed on the imaging surface in the horizontal direction (row direction) and vertical direction (column direction). In other words, the pixels 200 are arranged in a matrix. The pixels 200 are connected to row selection lines SEL for respective rows, and vertical output lines 105 for respective columns. A vertical scanning circuit 101 sequentially changes levels of the row selection lines SEL to Hi level to read out pixel signals of one row (selected row) to the vertical output lines 105. In the first embodiment, a circuit is formed using nMOS transistors. When a signal supplied to the gate of each nMOS transistor changes to Hi level, the nMOS transistor is turned on. When a signal supplied to the gate of the nMOS transistor changes to Low level, the nMOS transistor is turned off. The vertical output lines 105 are connected to a constant current source CS.

As shown in FIG. 2, the pixel 200 includes a photoelectric conversion unit 1, transfer unit 2, charge-voltage converter 3, reset unit 4, output unit SF, and selection unit 6.

The photoelectric conversion unit 1 generates charges corresponding to light, and stores them. The photoelectric conversion unit 1 is, for example, a photodiode.

The transfer unit 2 transfers charges in the photoelectric conversion unit 1 to the charge-voltage converter 3. The transfer unit 2 is, for example, a transfer transistor. When a Hi-level signal from the vertical scanning circuit 101 is supplied to the gate, the transfer unit 2 is turned on to transfer charges in the photoelectric conversion unit 1 to the charge-voltage converter 3.

The charge-voltage converter 3 converts transferred charges into a voltage. The charge-voltage converter 3 is, for example, a floating diffusion.

The reset unit 4 resets the charge-voltage converter 3. The reset unit 4 is, for example, a reset transistor. When the vertical scanning circuit 101 supplies a Hi-level signal to the gate, the reset unit 4 is turned on to reset the charge-voltage converter 3.

The output unit SF outputs a signal corresponding to the voltage of the charge-voltage converter 3 to the vertical output line 105. The output unit SF is, for example, an amplifier transistor. The output unit SF performs a source follower operation in conjunction with the constant current source CS connected to the vertical output line 105, outputting a signal corresponding to the voltage of the charge-voltage converter 3 to the vertical output line 105. The output unit SF outputs a noise signal corresponding to the voltage of the charge-voltage converter 3 to the vertical output line 105 when the reset unit 4 has reset the charge-voltage converter 3. The output unit SF outputs an optical signal corresponding to the voltage of the charge-voltage converter 3 to the vertical output line 105 when the transfer unit 2 has transferred charges in the photoelectric conversion unit 1 to the charge-voltage converter 3.

The selection unit 6 switches the pixel 200 between selected and deselected states. The selection unit 6 is, for example, a selection transistor. When the vertical scanning circuit 101 supplies a Hi-level signal to the gate via the row selection line SEL, the selection unit 6 is turned on to switch the pixel 200 into the selected state. When the vertical scanning circuit 101 supplies a Low-level signal to the gate via the row selection line SEL, the selection unit 6 is turned off to switch the pixel 200 into the deselected state.

Figure 3:
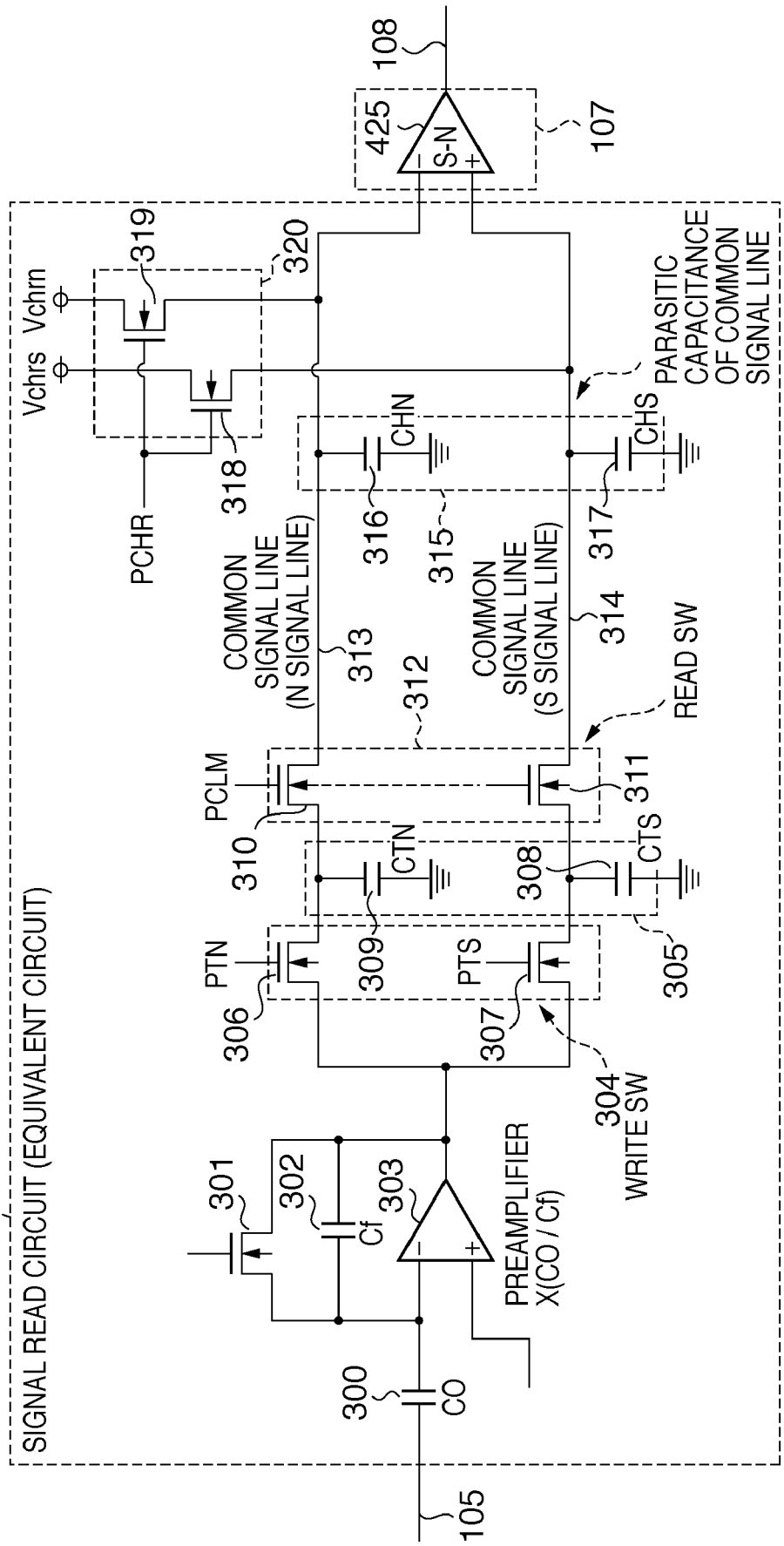
FIG. 3 is a circuit diagram of a circuit arrangement from the vertical output line to a read amplifier unit according to the first preferred embodiment of the present invention.

FIG. 3 is a circuit diagram of a signal read circuit 106, read amplifier unit 107, and output line 108 in FIG. 1. In FIG. 3, an optical signal is a signal for obtaining an image, and a noise signal is a reset signal (so-called noise signal) for the output unit (amplifier transistor) SF of the pixel array 103. In the optical signal, a signal corresponding to charges in the photoelectric conversion unit 1 is superimposed on a noise signal.

An optical signal and noise signal read out from the pixel array 103 to the vertical output line 105 are amplified by an amplifier unit (formed from a reset switch 301, capacitance 302, and preamplifier 303) via a capacitance 300. Hi-level pulses PTN and PTS are supplied to switches 306 and 307 of a write switch 304 at predetermined timings to write the signals in a CTN 309 and CTS 308 of a line memory 305, respectively. In the first embodiment, the capacitance 300 and amplifier unit form a clamp circuit which removes a pixel array noise signal from an optical signal. The offset of the amplifier unit is superimposed on a difference signal obtained by removing a noise signal from an optical signal, and the resultant signal is written as an S signal in the CTS 308. The offset of the amplifier unit is written as an N signal in the CTN 309.

The amplifier unit may also amplify an optical signal and noise signal output from pixels and output them as S and N signals without performing the clamp operation.

The S and N signals stored in the line memory 305 are respectively output to common signal lines 313 and 314 by sequentially supplying a Hi-level column selection pulse PCLM to switches 310 and 311 of a read switch 312 at predetermined timings. That is, when the read switch 312 is turned on, S and N signals of one column are respectively output by capacitance division to a parasitic capacitance 315 (formed from a CHN 316 and CHS 317) of the common signal lines 313 and 314. The N and S signals output to the parasitic capacitances CHN 316 and CHS 317 of the common signal lines 313 and 314 are respectively input to the inverting input terminal (−) and non-inverting input terminal (+) of the amplifier (a first read amplifier 425 or second read amplifier 427 shown in FIG. 4) of the read amplifier unit 107. The amplifier of the read amplifier unit 107 calculates the difference between the S and N signals to generate an image signal free from the offset of the amplifier unit. The image signal is output to the output line 108.

After signals of one column are output, reset switches 318 and 319 of a common signal line reset switch 320 are turned on to reset the common signal lines 313 and 314 to reset voltages Vchrs and Vchrn, respectively. More specifically, when the read switch 312 is turned on while the reset switches 318 and 319 are OFF, the common signal lines 313 and 314 hold a signal-level voltage. When the read switch 312 is turned off while the reset switches 318 and 319 are ON, the common signal lines 313 and 314 hold a reset voltage and are reset. In addition to the switches 310 and 311, switches for a plurality of columns (not shown) are connected to the common signal lines 313 and 314.

Figure 4:
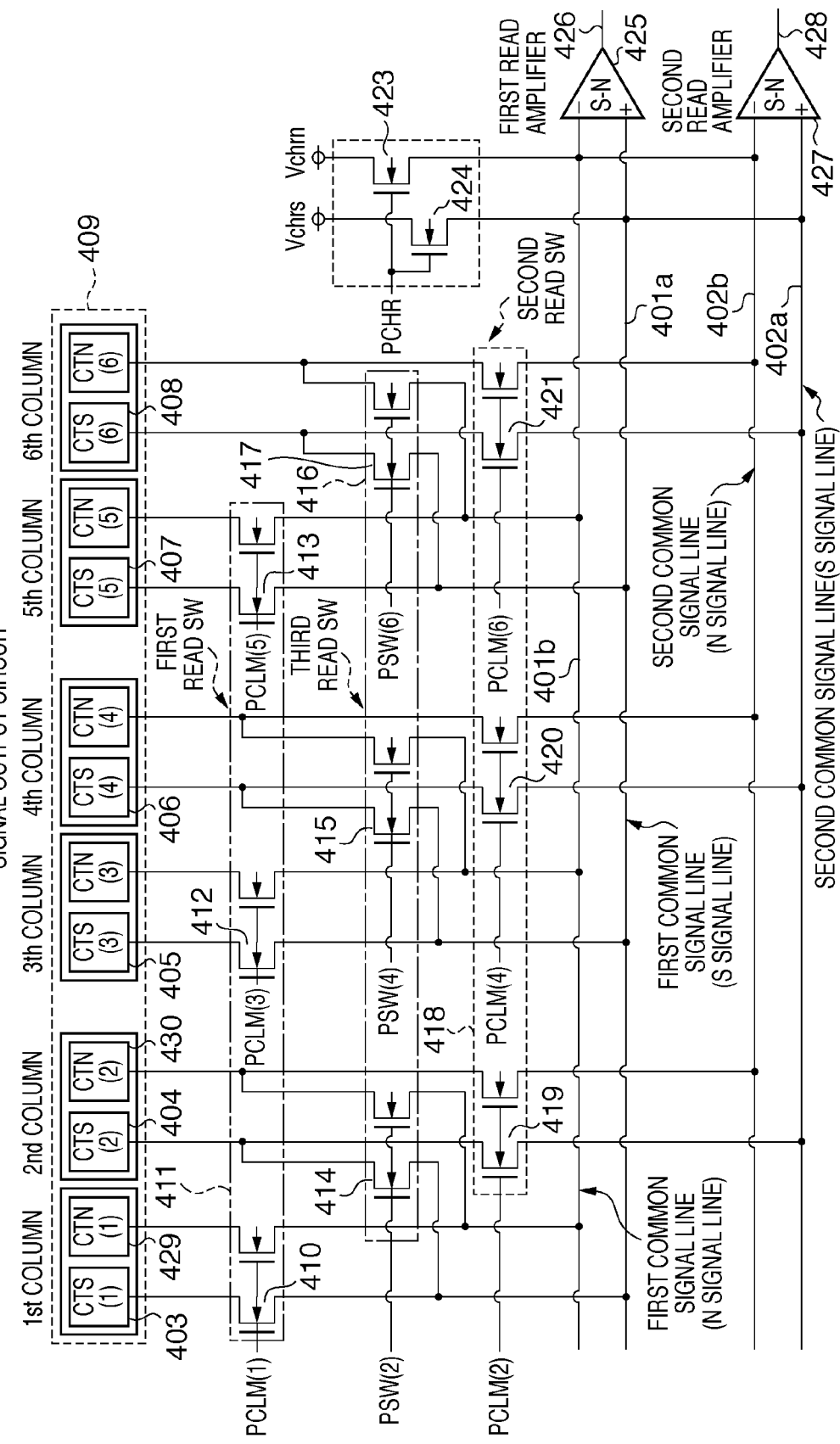
FIG. 4 is a circuit diagram of a circuit arrangement from a line memory to the read amplifier unit according to the first preferred embodiment of the present invention.

FIG. 4 is a circuit diagram showing in detail a circuit arrangement from the line memory to the read amplifier unit. FIG. 4 exemplifies a signal output circuit when 6×6 pixels 200 are arranged in the vertical and horizontal directions in the pixel array 103. A CTS 403 and CTN 429 on the left side of FIG. 4 correspond to pixels 200 on the first column, and are represented as CTS(1) and CTN(1). Similarly, a numerical value in parentheses suffixed to a component name or signal name represents the column number of a corresponding pixel 200.

CTN(1) to CTN(6) are capacitive elements (memories) for storing an N signal. CTS(1) to CTS(6) are capacitive elements (memories) for storing an S signal. A CTS and CTN are arranged on each column. CTS(1) to CTS(6) and CTN(1) to CTN(6) function as a line memory 409 for S and N signals.

As shown in FIG. 3, S and N signals stored in the CTS 308 and CTN 309 are transmitted to the input terminals of the read amplifier unit 107 via paths having the same arrangement. The S and N signals are respectively output to the common signal lines 313 and 314 at a timing when the common column selection pulse PCLM changes to Hi level. That is, the timing and circuit arrangement until an N signal is output from the line memory 305 to the read amplifier unit 107 are equivalent to that for an S signal. For this reason, a description for the N signal will not be repeated in the description of FIG. 4, and the timing and circuit arrangement for an S signal will be explained.

As shown in FIG. 4, the first embodiment adopts a third read switch 416. This arrangement can execute a mode in which the first read amplifier 425 is activated to output a pixel signal to an output line 426, and a mode in which both the first and second read amplifiers 425 and 427 are activated to parallel-output pixel signals to the output line 426 and an output line 428. The first and second read modes can be arbitrarily changed. In the first read mode, the second read amplifier 427 can be stopped to suppress power consumption. In the second read mode, both the first and second read amplifiers 425 and 427 can be activated to parallel-read out pixel signals at high speed. A pulse PSW(2), PSW(4), PSW(6) can be respectively supplied with each read switch 414, 415, 417 of the third read switch 416, by an arbitrary circuit such as the horizontal scanning circuit 102 and outer circuit.

In FIG. 4, first and second read switches 411 and 418 are turned on/off in accordance with column selection pulses PCLM(1) and PCLM(2) from a horizontal scanning circuit 102. A case where read switches 410 and 419 are turned on (while a read switch 414 is OFF) will be explained. In this case, signals stored in the CTS(1) 403, the CTN(1) 429, a CTS(2) 404, and a CTN(2) 430 in the line memory 409 are respectively output to first common signal lines 401a and 401b, and second common signal lines 402a and 402b. Next, a case where the read switches 410 and 419 are turned off (while the read switch 414 is OFF) will be explained. In this case, the CTS(1) 403, CTN(1) 429, CTS(2) 404, and CTN(2) 430 in the line memory 409, are electrically disconnected from the common signal lines 401a, 401b, 402a, and 402b.

Each read switch 414, 415, 417 of the third read switch 416 electrically connects the output terminal of each of the CTS 404, a CTS 406, and a CTS 408 on even-numbered columns to the output terminal of each of the read switch 410, a read switch 412, and a read switch 413 on odd-numbered columns. Typically, the input terminal of each read switch 414, 415, 417 of the third read switch 416 is connected to a line which connects the output terminal of each of the CTSs 404, 406, and 408 on even-numbered columns to the input terminal of each of the read switch 419, a read switch 420, and a read switch 421 on the same columns. The output terminal of each read switch 414, 415, 417 of the third read switch 416 is connected to a line which connects the output terminal of each of the read switches 410, 412, and 413 on odd-numbered columns to the first common signal line 401a. The "line" includes a line of a metal interconnection and a line of a diffusion layer interconnection. Hence, each read switch 414, 415, 417 of the third read switch 416 may also be electrically connected via an interconnection, or may also be electrically connected to an active region in a semiconductor substrate.

When a pulse PSW(2) received from the horizontal scanning circuit 102 is at Hi level, the read switch 414 of the third read switch 416 is turned on to connect the output terminal of the CTS(2) 404 to the output terminal of the read switch 410 on a left adjacent column. When the pulse PSW(2) received from the horizontal scanning circuit 102 is at Low level, the read switch 414 is turned off to electrically disconnect the output terminal of the CTS(2) 404 from the output terminal of the read switch 410 on a left adjacent column. This also applies not only to the read switch 414 but also to the remaining read switches 415, 417 of the third read switch 416.

The first and second common signal lines (S signal lines) 401a and 402a are respectively connected to the non-inverting input terminals of the first and second read amplifiers 425 and 427. The first and second common signal lines (N signal lines) 401b and 402b are respectively connected to the inverting input terminals of the first and second read amplifiers 425 and 427.

In the first embodiment, the electrical characteristics of the first, second, and third read switches 411, 418, and 416 are preferably equivalent to each other. For example, the first, second, and third read switches 411, 418, and 416 are formed using nMOS transistors, and their gate lengths and gate widths are made equivalent to each other. Accordingly, even when reading out a signal in the first read mode, the electrical characteristics of signal paths can be made equivalent to each other. The first and second common signal lines 401a and 402a are connected to the common signal line reset voltage source Vchrs via a common signal line reset switch 424.

When a pulse PCHR from the horizontal scanning circuit 102 is at Hi level, the common signal line reset switch 424 resets the first and second common signal lines 401a and 402a to the reset voltage level. When the pulse PCHR is at Low level, the common signal line reset switch 424 electrically disconnect the common signal line reset voltage source Vchrs from the first and second common signal lines 401a and 402a. Similarly, when the pulse PCHR is at Hi level, a common signal line reset switch 423 resets the first and second common signal lines 401b and 402b to the reset voltage level. When the pulse PCHR is at Low level, the common signal line reset switch 423 electrically disconnect the common signal line reset voltage source Vchrn from the first and second common signal lines 401b and 402b.

S and N signals are parallel-output from the line memory 409 to the non-inverting and inverting input terminals of the first and second read amplifiers 425 and 427 via identical circuit arrangements at the same timing. The first and second read amplifiers 425 and 427 calculate the differences between input S and N signals, and output the signals outside the sensor chip via the output lines 426 and 428. The first and second read amplifiers may not calculate the differences between S and N signals. In this case, the differences between S and N signals are calculated outside the photoelectric conversion device 100.

Figure 5:
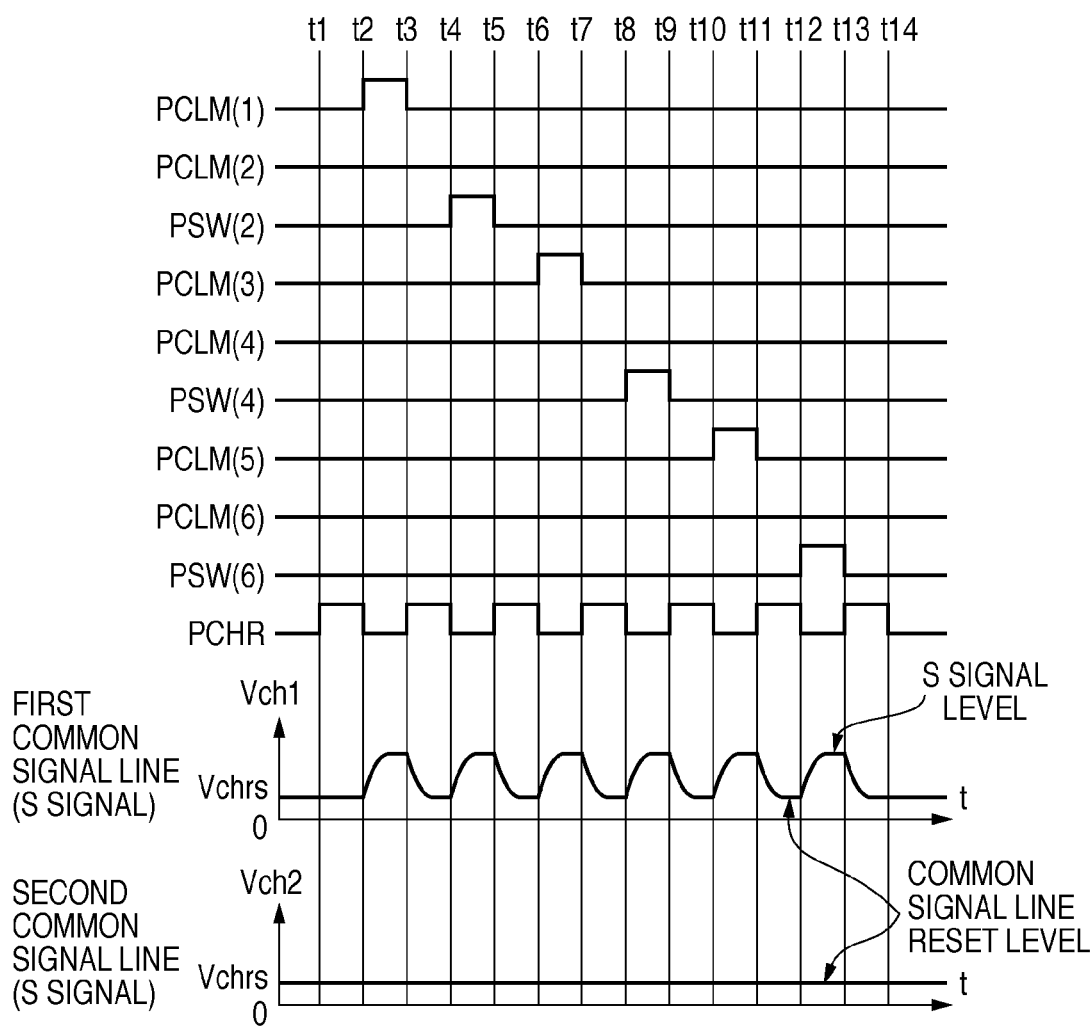
FIG. 5 is a timing chart showing an operation in the first read mode according to the first preferred embodiment of the present invention.

An operation in the first read mode will be explained in detail with reference to FIG. 5. FIG. 5 is a timing chart of pulses for driving the respective switches shown in FIG. 4 in the first read mode. FIG. 5 also shows fluctuations of the potentials (levels) of the first and second common signal lines (S signal) 401a and 402a.

In the first read mode, as shown in FIG. 5, column selection pulses PCLM(2), PCLM(4), and PCLM(6) remain at Low level in order to always keep the read switches 419, 420, 421 of the second read switch 418 OFF. Before timing t1, S and N signals of one row are written in the line memory 409 at predetermined timings of the pulses PTS and PTN. Operations at timings t1 to t14 shown in FIG. 5 will be explained.

At timing t1, the pulse PCHR changes to Hi level to turn on the common signal line reset switches 423 and 424. In response to this, the first common signal lines 401a and 401b are reset to levels corresponding to the common signal line reset voltages Vchrs and Vchrn, and the second common signal lines 402a and 402b are reset to levels corresponding to the common signal line reset voltages Vchrs and Vchrn.

At timing t2, the pulse PCHR changes to Low level to complete resetting of the first and second common signal lines. That is, the first common signal lines 401a and 401b and the second common signal lines 402a and 402b, are electrically disconnected from the common signal line reset voltage sources Vchrs and Vchrn.

The column selection pulse PCLM(1) for the first column changes to Hi level to connect the CTS(1) 403 serving as the first storage unit to the first common signal line 401a. Then, an S signal stored in the CTS(1) 403 is output to the first common signal line 401a.

More specifically, the level of the first common signal line 401a gradually changes from that of the common signal line reset voltage Vchrs to that of the S signal. At this time, the resistance component applied from the CTS(1) 403 to the first common signal line 401a is given by the sum of the resistance component of the first read switch 410 and the interconnection resistance from the CTS(1) 403 to the first read amplifier 425.

At the same timing, an N signal is also output from the CTN(1) 429 to the first common signal line (N signal) 401b via an corresponding circuit arrangement. The level of the first common signal line (N signal) 401b gradually changes from that of the common signal line reset voltage Vchrn to that of the N signal.

Subsequently, the output voltage of the first read amplifier 425 is held at a predetermined timing, obtaining the pixel signal of the first column.

At timing t3, after an output signal from the first read amplifier 425 is obtained, the column selection pulse PCLM(1) for the first column changes to Low level. At timing t3, the level of the first common signal line 401a has reached that of the S signal of the first column. Thus, the pulse PCHR changes to Hi level to reset the level of the first common signal line 401a to that of the common signal line reset voltage Vchrs.

At timing t4, after the first common signal line 401a changes to the level of the common signal line reset voltage Vchrs, the pulse PCHR changes to Low level to electrically disconnect the first common signal line 401a from the common signal line reset voltage source Vchrs again. The column selection pulse PSW(2) for the second column changes to Hi level to connect the output terminal of the CTS(2) 404 serving as the second storage unit to the output terminal (first common signal line 401a) of the read switch 410. In response to this, an S signal stored in the CTS(2) 404 is output to the first common signal line 401a. That is, similar to timings t2 and t3, the level of the first common signal line 401a gradually changes from that of the common signal line reset voltage Vchrs to that of the S signal. At this time, the resistance component applied from the CTS(2) 404 to the first common signal line 401a is given by the sum of the resistance component of the third read switch 414 and the interconnection resistance from the CTS(2) 404 to the first read amplifier 425.

At the same timing, an N signal is also output from the CTN(2) 430 to the first common signal line (N signal) 401b via an identical circuit arrangement. The level of the first common signal line 401b for the N signal gradually changes from that of the common signal line reset voltage Vchrn to that of the N signal.

Subsequently, the output voltage of the first read amplifier 425 is held at a predetermined timing, obtaining the pixel signal of the second column.

At timing t5, after an output signal from the first read amplifier 425 is obtained, the column selection pulse PCLM(2) for the second column changes to Low level. At timing t5, the voltage of the first common signal line 401a has reached a signal-level voltage on the second column. Hence, the pulse PCHR changes to Hi level to reset the first common signal line 401a again to the common signal line reset voltage. Similarly, the pixel signals of the third and fourth columns are output during the period between timings t5 and t9, and those of the fifth and sixth columns are output during the period between timings t9 and t13. In this manner, pixel signals of one row selected by the vertical scanning circuit 101 can be obtained during the period between timings t1 and t13.

In the first embodiment, pixels of six rows are arranged in the vertical direction. To read out all pixel signals, the operations at timings t1 to t13 are repeated six times.

As described above, in the first read mode, the resistance component applied from the line memory 409 to the first read amplifier 425 is as follows. When reading out a pixel signal from an odd-numbered column, the resistance component is given by the sum of the resistance component of the first read switch 411 and the interconnection resistance from the line memory 409 to the first read amplifier 425. When reading out a pixel signal from an even-numbered column, the resistance component is given by the sum of the resistance component of a read switch of the third read switch 416 and the interconnection resistance of a line from the line memory 409 to the first read amplifier 425. The electrical characteristics (e.g., gate length and gate width) of the respective switches are almost equal to each other. Thus, a signal delay when reading out a pixel signal from an odd-numbered column and that when reading out a pixel signal from an even-numbered column become equal to each other.

The delays of signals from odd- and even-numbered columns when holding them become equal to each other, so the offsets of signals caused by the delays of signals from odd- and even-numbered columns when holding them become equal to each other. Both the offsets of signals from odd- and even-numbered columns can be reduced. Further, the delay until the common signal line is reset to a reset voltage can also be made equal between odd- and even-numbered columns. The offsets of signals caused by the delays of signals from odd- and even-numbered columns in resetting can be reduced. As a result, the offsets of signals from odd- and even-numbered columns can be reduced.

Since signals from odd- and even-numbered columns are output from a common read amplifier, the amplifier offsets of the signals from odd- and even-numbered columns can also be made equal.

More specifically, the offsets of signals from odd- and even-numbered columns become equal to each other, and can be removed as common offsets on the output stage (e.g., a sensed signal processing circuit 95 shown in FIG. 13) of the photoelectric conversion device 100. Both the offsets of signals from odd- and even-numbered columns can be reduced. In other words, when the number of output systems (the number of output terminals which actually output a signal) is limited by the relationship with the outside of the photoelectric conversion device, like the first read mode, a signal suitable for reducing the offset can be output among signals output from pixels on different columns (even- and odd-numbered columns) in the pixel array.

Figure 6:
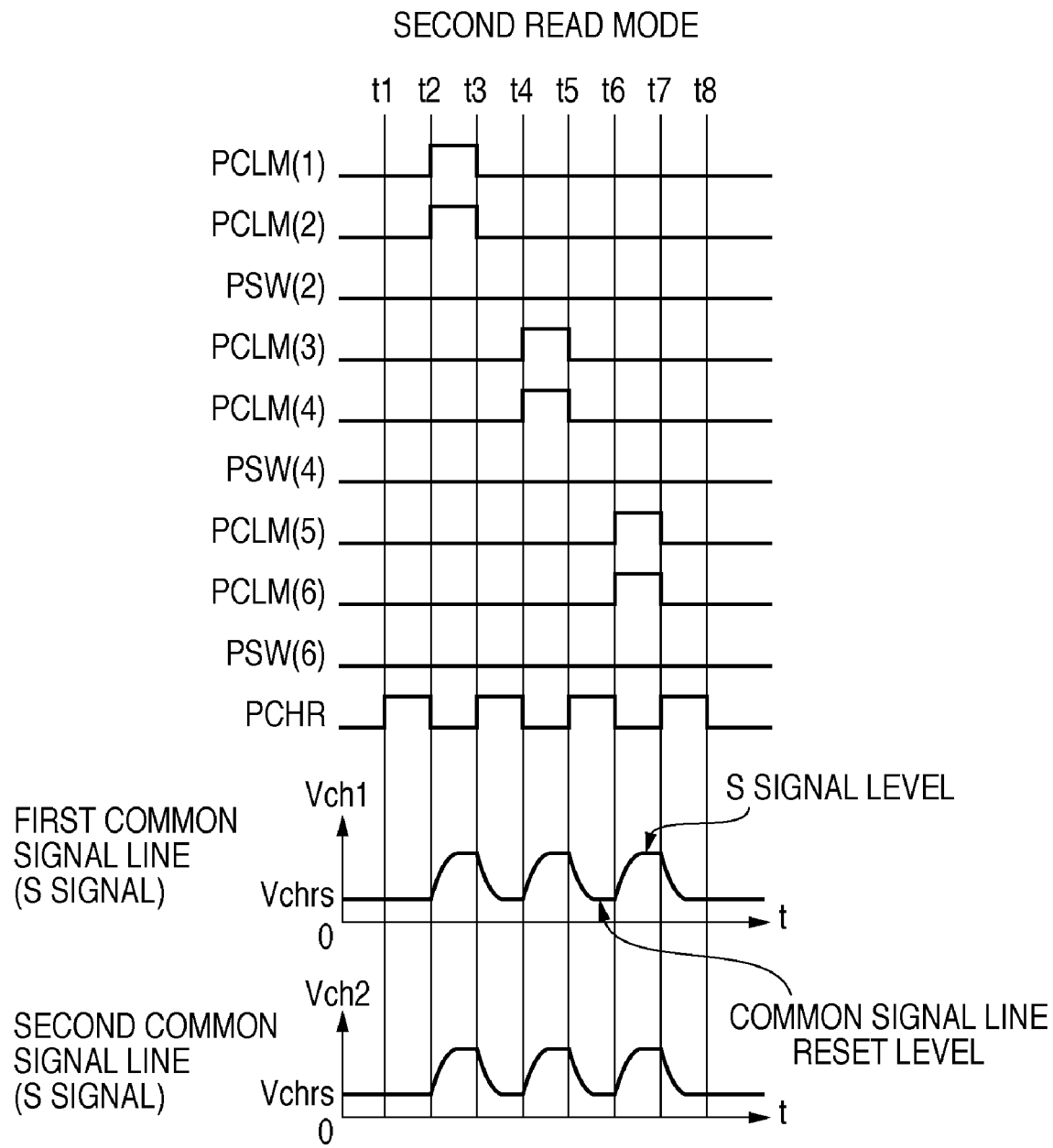
FIG. 6 is a timing chart showing an operation in the second read mode according to the first preferred embodiment of the present invention.

An operation in the second read mode will be explained in detail with reference to FIG. 6. FIG. 6 is a timing chart of pulses for driving the respective switches shown in FIG. 4 in the second read mode. FIG. 6 also shows fluctuations of the potentials (levels) of the first and second common signal lines (S signal) 401a and 402a.

In the second read mode, as shown in FIG. 6, the column selection pulses PSW(2), PSW(4), and PSW(6) remain at Low level in order to always keep each read switch 414, 415, 417 of the third read switch 416 OFF. Before timing t1, S and N signals of one row are written in the line memory 409 at predetermined timings of the pulses PTS and PTN. Operations at timings t1 to t8 shown in FIG. 6 will be explained.

At timing t1, the pulse PCHR changes to Hi level to turn on the common signal line reset switches 423 and 424. In response to this, the first common signal lines 401a and 401b are reset to the common signal line reset voltages Vchrs and Vchrn, and the second common signal lines 402a and 402b are reset to the common signal line reset voltages Vchrs and Vchrn.

At timing t2, the pulse PCHR changes to Low level to electrically disconnect the first common signal lines 401a and 401b and the second common signal lines 402a and 402b, from the common signal line reset voltage sources Vchrs and Vchrn respectively. The column selection pulse PCLM(1) for the first column and the column selection pulse PCLM(2) for the second column change to Hi level to connect the CTS(1) 403 and CTS(2) 404 to the first and second common signal lines 401a and 402a respectively. The level of a signal stored in the CTS(1) 403 is output to the first common signal line 401a, and that of a signal stored in the CTS(2) 404 is output to the second common signal line 402a.

That is, the first and second common signal lines 401a and 402a gradually change from the level of the common signal line reset voltage Vchrs to that of the S signal.

At this time, the resistance component applied from the CTS(1) 403 to the first common signal line 401a is given by the sum of the resistance component of the first read switch 410 and the interconnection resistance of a line from the CTS(1) to the first read amplifier 425. The resistance component applied from the CTS(2) 404 to the second common signal line 402a is given by the sum of the resistance component of the second read switch 419 and the interconnection resistance of a line from the CTS(2) to the second read amplifier 427.

At the same timing, N signals are also output from the CTN(1) 429 and CTN(2) 430 to the first common signal lines (N signal) 401b and 402b via identical circuit arrangements respectively. The first and second common signal lines (N signal) 401b and 402b gradually change from the level of the common signal line reset voltage Vchrn to that of the N signal respectively.

Subsequently, the output voltages of the first and second read amplifiers 425 and 427 are held at a predetermined timing to simultaneously obtain the pixel signals of the first and second columns. That is, when the photoelectric conversion device is driven at the same operating frequency, a pixel signal can be obtained at a double frame rate in the second read mode, compared to the first read mode.

At timing t3, after output signals from the first and second read amplifiers 425 and 427 are obtained, the column selection pulse PCLM(1) for the first column and the column selection pulse PCLM(2) for the second column change to Low level. At timing t3, the levels of the first and second common signal lines 401a and 402a have reached those of S signals on the first and second columns, respectively. Thus, the pulse PCHR changes to Hi level to reset the levels of the first and second common signal lines 401a and 402a to that of the common signal line reset voltage Vchrs.

Similarly, the pixel signals of the third and fourth columns are output during the period between timings t3 and t5, and those of the fifth and sixth columns are output during the period between timings t5 and t7. Accordingly, pixel signals of one row selected by the vertical scanning circuit 101 can be obtained.

In the first embodiment, pixels of six rows are arranged in the vertical direction. To read out all pixel signals, the operations at timings t1 to t8 are repeated six times.

As described above, in the second read mode, the resistance component applied from the line memory 409 to the read amplifier 425 is as follows. When reading out a pixel signal from an odd-numbered column, the resistance component is given by the sum of the resistance component of the first read switch 410 and the interconnection resistance of a line from the line memory 409 to the first read amplifier 425. When reading out a pixel signal from an even-numbered column, the resistance component is given by the sum of the resistance component of the second read switch 419 and the interconnection resistance of a line from the line memory 409 to the second read amplifier 427. The electrical characteristics (e.g., gate length and gate width) of the respective switches are equal to each other. Thus, a signal delay when reading out a pixel signal from an odd-numbered column and that when reading out a pixel signal from an even-numbered column become equal to each other. As a result, when reading out signals output to the first and second common signal lines, the offsets of the two outputs can be reduced, reducing a streak in the image.

The arrangement according to the first embodiment can change the photoelectric conversion device between the mode in which a pixel signal is output to a single output line and the mode in which pixel signals are parallel-output to a plurality of output lines. The number of output terminals connected to output lines, that is, the number of output systems can be changed, and image degradation can be reduced.

It should be noted that, in the first read mode, an operation to turn on the read switch 419 of the second read switch 418 may also be executed parallel to an operation to turn on the read switch 414 of the third read switch 416. Similarly, an operation to turn on the read switch 420 of the second read switch 418 may also be executed parallel to an operation to turn on the read switch 415 of the third read switch 416. For example, PCLM(2) may also change to Hi level during the period between timings t4 and t5 shown in FIG. 5. In this case, the signal of the CTS(2) 404 is read out to the first common signal line 401a and the second common signal line. Since a signal from the single CTS(2) 404 can be read out to the first and second read amplifiers 426 and 427, a signal suited to correct the offsets of the first and second read amplifiers 426 and 427 can be output.

Second Embodiment

The second embodiment considers a parasitic capacitance generated by the third switch as a factor of signal delays (i.e., a cause of generating an offset) on first common signal lines 401a and 401b and second common signal lines 402a and 402b in FIG. 4.

Figure 7:
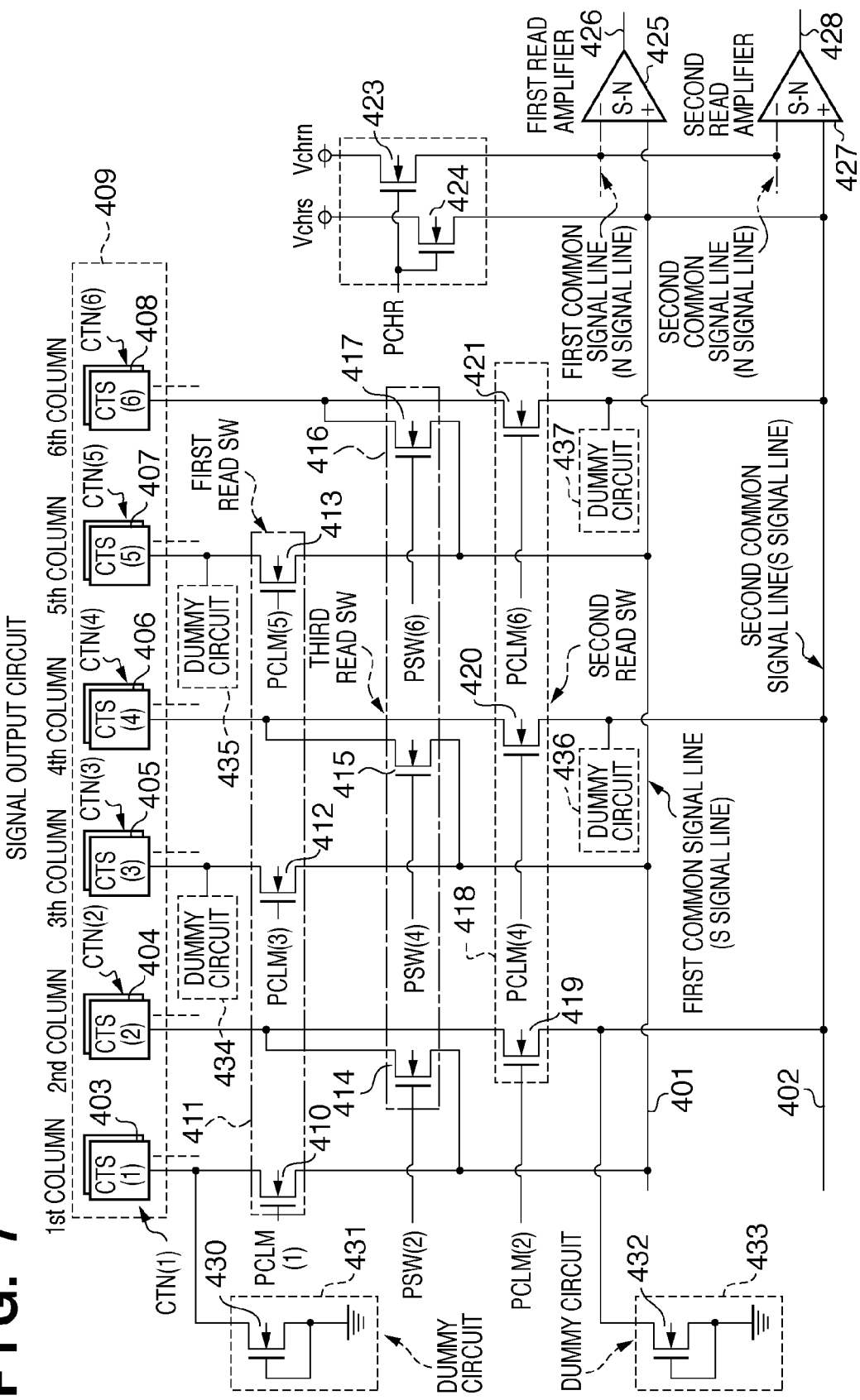
FIG. 7 is a circuit diagram of a circuit arrangement from a line memory to a read amplifier unit according to the second preferred embodiment of the present invention.

The second preferred embodiment of the present invention will be described in detail with reference to FIG. 7. FIG. 7 is a circuit diagram showing in detail a circuit arrangement from a line memory to a read amplifier unit.

In FIG. 7, pulses for driving respective switches, and the circuit arrangement are the same as those in the first embodiment, and a detailed description thereof will not be repeated.

In the second embodiment, dummy circuits are arranged in the arrangement of the first embodiment so as to equalize the parasitic capacitances of vertical signal lines and common signal lines. More specifically, dummy switches 430 and 432 and the like equal in electrical characteristics to first, second, and third read switches 411, 418, and 416 are arranged.

The dummy switch 430 is connected to a line which connects the output terminal of a CTS(1) 403 corresponding to pixels on an odd-numbered column, and the input terminal of the read switch 410 on the same column of the first read switch 411. The dummy switch 432 is connected to a line which connects the output terminal of a read switch 419 corresponding to pixels on an even-numbered column in the second read switch 418, and a second common signal line 402.

The gate terminals of the dummy switches 430 and 432 are connected to GND level, and thereby the dummy switches 430 and 432 are inactive. A circuit configured in this way will be called a dummy circuit. Dummy circuits 434, 435, 436, and 437 are configured similarly to dummy circuits 431 and 433.

In the above-described way, the dummy circuits 431, 433, 434, 436, 435, and 437 are arranged corresponding to the first to sixth columns. In the first read mode, the dummy circuits 431, 433, 434, 436, 435, and 437 make a parasitic capacitance on a line connecting an odd-numbered CTS and a read switch of the first read switch 411 equal to that on a line connecting an even-numbered CTS and a read switch of the third read switch 416. This equalizes signal delays.

In the second read mode, the dummy circuits 431, 433, 434, 436, 435, and 437 make a parasitic capacitance on a line connecting an odd-numbered CTS and a first common signal line 401 equal to that on a line connecting an even-numbered CTS and the second common signal line 402. This equalizes signal delays, reducing a streak in the image.

As described above, in the first read mode, the parasitic capacitance generated on a line extending from the line memory 409 to a first read amplifier 425 is as follows. When reading out a pixel signal from an odd-numbered column, the parasitic capacitance is given by the sum of the capacitive component of the first dummy switch 430 arranged in the first dummy circuit 431 interposed between the line memory 409 and the first read switch 411, and that of the third read switch 416 (OFF). When reading out a pixel signal from an even-numbered column, the parasitic capacitance is given by the sum of the capacitive component of a read switch of the first read switch 411 (OFF), and that of the second dummy switch 432 (OFF) of the second dummy circuit 433.

In the second read mode, the parasitic capacitance generated on a line extending from the line memory 409 to the first read amplifier 425 and a second read amplifier 427 is as follows. When reading out a pixel signal from an odd-numbered column, the parasitic capacitance is given by the sum of the capacitive component of the dummy switch 430 connected a line between the line memory 409 and the first read switch 411, and the capacitive component of the third read switch 416 (OFF). When reading out a pixel signal from an even-numbered column, the parasitic capacitance is given by the sum of the capacitive component of the read switch 414 of the third read switch 416 (OFF), and the capacitive component of the dummy switch 432 (OFF) of the second dummy circuit 433 connected between the read switch 419 of the second read switch 418 and the second common signal line 402. All the gate lengths, gate widths, and electrical characteristics of the respective switches are equal to each other.

In this manner, a signal delay when reading out a pixel signal from an odd-numbered column and that when reading out a pixel signal from an even-numbered column become equal to each other in both the first and second read modes. That is, a signal to the first common signal line 401 and that to the second common signal line 402 can be so output as to reduce the offsets of the two outputs, reducing a streak in the image.

Third Embodiment

Figure 8:
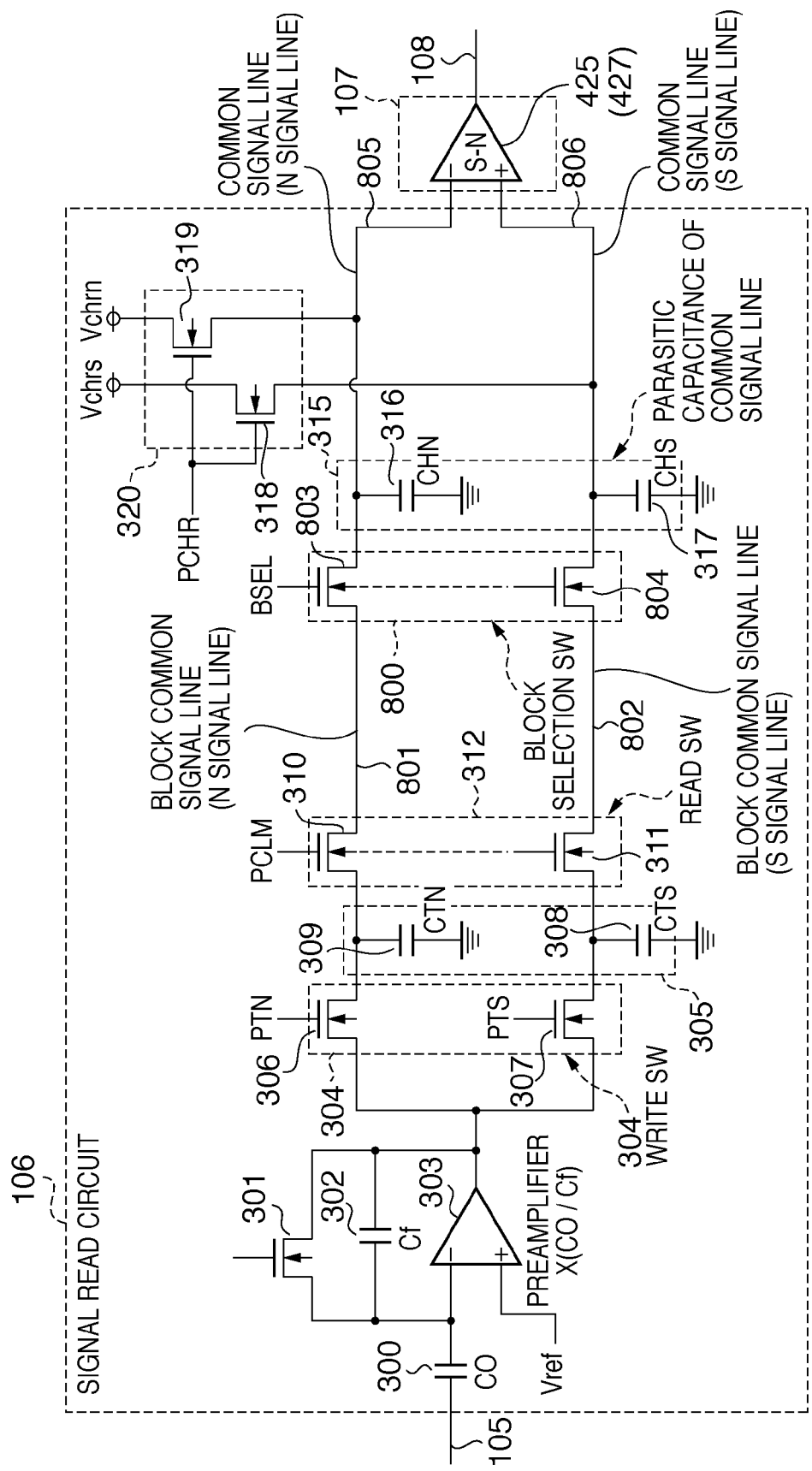
FIG. 8 is a circuit diagram of a circuit arrangement from a vertical output line to a read amplifier unit according to the third preferred embodiment of the present invention.

FIG. 8 is a circuit diagram of a signal read circuit 106 when a technique disclosed in Japanese Patent Laid-Open No. 2005-086260 to divide a line memory into blocks and read out signals is applied to the present invention.

Difference signals between optical and noise signals read out from a pixel array 103 to a vertical output line 105 are amplified by a preamplifier 303 in an amplifier unit. Pulses PTS and PTN change to Hi level at predetermined timings to write the amplified signals in a line memory 305.

When switches 803 and 804 of a block selection switch 800 are turned on, column selection pulses PCLM sequentially change to Hi level to output the S and N signals stored in the line memory 305 to common signal lines 805 and 806, respectively. When the block selection switch 800 is OFF, block common signal lines 801 and 802 are electrically disconnected from the common signal lines 805 and 806. That is, when a read switch 312 is sequentially turned on while the block selection switch 800 is ON, N and S signals of one block are simultaneously output to the common signal lines 805 and 806, respectively. The N and S signals output to the common signal lines 805 and 806 are input to the inverting input terminal (−) and non-inverting input terminal (+) of a read amplifier unit 107 respectively. The amplifier of the read amplifier unit 107 calculates the difference between the S and N signals to generate an image signal free from the offset of the amplifier unit. The generated image signal is output to an output line 108.

After outputting signals of one column, each reset switch 318, 319 of the common signal line reset switch 320 is turned on to reset the levels of the common signal lines 805 and 806 to those of reset voltages Vchrs and Vchrn.

More specifically, the common signal lines 805 and 806 hold N signal-level voltage and S signal-level voltage when each read switch 310, 311 of the read switch 312 is turned on while each reset switch 318, 319 of the common signal line reset switch 320 is OFF. The common signal lines 805 and 806 hold a reset voltage when each read switch 310, 311 of the read switch 312 is turned off and each reset switch 318, 319 of the reset switch 320 is turned on.

Figure 9:
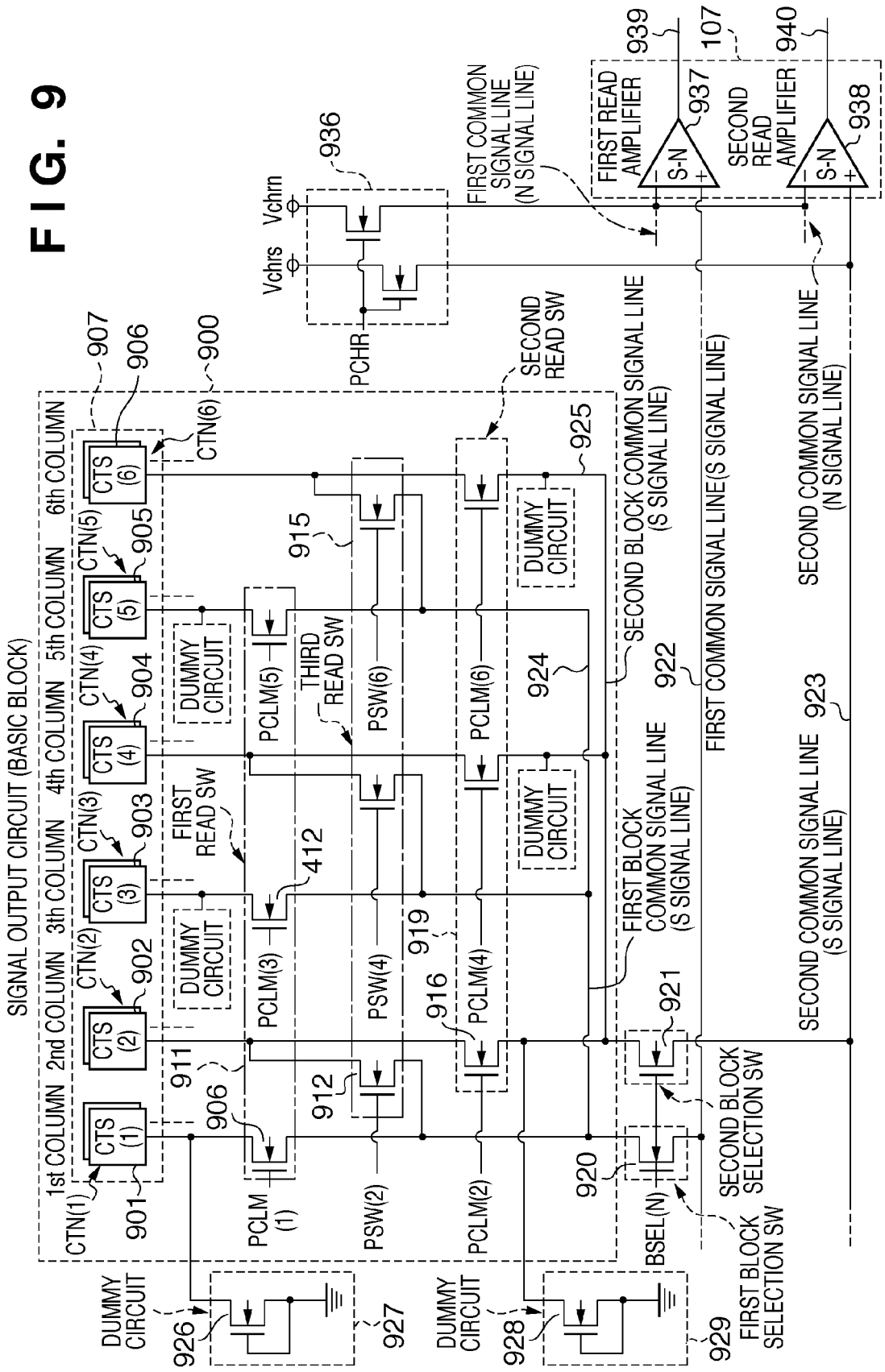
FIG. 9 is a circuit diagram of a circuit arrangement from a line memory to a read amplifier according to the third preferred embodiment of the present invention.

A signal read circuit 106 according to the third embodiment will be explained in detail with reference to FIG. 9. FIG. 9 is a circuit diagram showing in detail a circuit arrangement from the line memory to the read amplifier unit.

Assume that the pixel array 103 according to the third embodiment is formed from six pixels 200 in the vertical direction and eighteen pixels 200 in the horizontal direction. The signal read circuit 106 includes a plurality of (e.g., three) read blocks which hold signals from pixels on six columns per block. In correspondence with this arrangement, a line memory in the signal read circuit 106 includes a plurality of (e.g., three) storage blocks MB which hold signals from pixels on six columns per block.

FIG. 9 shows one read block including six 1-column parts of the signal read circuit 106 shown in FIG. 8. In the third embodiment, three basic blocks, that is, read blocks 900 shown in FIG. 9 are arranged in the horizontal direction. Each read block 900 is connected to first and second common signal lines 922 and 923 via first and second block selection switches 920 and 921 (all the read blocks 900 are not shown).

As factors of signal delays (i.e., causes of generating an offset) on the first and second common signal lines 922 and 923, the third embodiment considers the parasitic capacitance in addition to the resistance component. As shown in FIG. 9, a dummy switch 926 of a first dummy circuit 927 is connected to a line between a CTS on an odd-numbered column and a first read switch 911 on the same column. A dummy switch 928 of a second dummy circuit 929 is connected to a line between a second read switch 919 on an even-numbered column and a second block common signal line 925. The dummy switches 926 and 928 have the same gate length, gate width, and electrical characteristic as those of the first read switch 911, the second read switch 919, and a third read switch 915. The gate terminals of the dummy switches 926 and 928 are connected to GND level, and the dummy switches 926 and 928 are inactive.

In the third embodiment, two, first and second read amplifiers 937 and 938 are arranged in the read amplifier unit 107 shown in FIG. 8. This arrangement can execute the first read mode in which the first read amplifier 937 is activated to output a pixel signal to an output line 939, and the second read mode in which both the first and second read amplifiers 937 and 938 are activated to parallel-output pixel signals to the output line 939 and an output line 940.

As shown in FIG. 8, S and N signals stored in the CTS 308 and CTN 309 are transmitted to the input terminals of the read amplifier unit 107 via paths having the same structure. The S and N signals are respectively output to the common signal lines 805 and 806 via the block common signal lines 801 and 802 at a timing when a common block selection pulse BSEL and column selection pulse PCLM change to Hi level. That is, the timing and circuit arrangement until an N signal is output from the line memory 305 to the read amplifier unit 107 are equivalent to those for an S signal. For this reason, a description for the N signal will not be repeated in the third embodiment, and the timing and circuit arrangement for an S signal will be explained.

In FIG. 9, the read switch 906 of the first read switch 911 and the read switch 916 of the second read switches 919 are turned on/off in accordance with column selection pulses PCLM(1) and PCLM(2) from a horizontal scanning circuit 102 respectively. When the read switches 906 and 916 are ON, signals stored in a storage block 907 are respectively output to a first block common signal line 924 and the second block common signal line 925 respectively. When the switches 906 and 916 are OFF, the storage block 907 are electrically disconnected form the block common signal lines 924 and 925 respectively.

In the storage block 907, CTS(1), CTS(3), and CTS(5) serving as the first storage unit for storing signals output from pixels on odd-numbered columns in the pixel array, and CTS (2), CTS(4), and CTS(6) serving as the second storage unit for storing signals output from pixels on even-numbered columns in the pixel array are alternately arrayed.

The read switch 912 of the third read switch 915 connects a line between the output terminal of CTS 902 and the input terminal of the read switch 916 to a line between the output terminal of the read switch 906 and the first block common signal line 924. The CTS 902 corresponds to pixels on even-numbered columns, the read switch 916 corresponds to pixels on the same columns in the second read switch 919, and the read switch 906 corresponds to pixels on odd-numbered columns in the first read switch 911.

When a pulse PSW received from the horizontal scanning circuit 102 is at Hi level, the read switch 912 electrically connects those lines. When the pulse PSW received from the horizontal scanning circuit 102 is at Low level, the read switch 912 electrically disconnects those lines.

When the block selection pulse BSEL received from the horizontal scanning circuit 102 is at Hi level, the first and second block selection switches 920 and 921 respectively connect the first and second block common signal lines 924 and 925 to the first and second common signal lines 922 and 923. In response to this, the first and second block selection switches 920 and 921 read out signals transmitted through the first and second block common signal lines 924 and 925 to the first and second common signal lines 922 and 923. To the contrary, when the block selection pulse BSEL received from the horizontal scanning circuit 102 is at Low level, the first and second block selection switches 920 and 921 respectively electrically disconnect the first and second block common signal lines 924 and 925 from the first and second common signal lines 922 and 923.

Signals passing through the first and second common signal lines 922 and 923 are input to the non-inverting input terminals of the first and second read amplifiers 937 and 938 (N signals are input to the inverting input terminals).

In the third embodiment, the electrical characteristics of the first, second, and third read switches 911, 919, and 915 are preferably equivalent to each other. For example, the first, second, and third read switches 911, 919, and 915 are formed from nMOS transistors with the same gate length and gate width, obtaining the same electrical characteristic.

The first and second common signal lines 922 and 923 are connected to the common signal line reset voltage source Vchrs via a common signal line reset switch 936.

When a pulse PCHR from the horizontal scanning circuit 102 is at Hi level, the common signal line reset switch 936 resets the levels of the first and second common signal lines 922 and 923 to the reset voltage level. When the pulse PCHR is at Low level, the common signal line reset switch 936 electrically disconnects the common signal line reset voltage source Vchrs from the first and second common signal lines 922 and 923.

The first and second read amplifiers 937 and 938 in a read amplifier unit 107 parallel-receive S and N signals to their non-inverting input terminals and inverting input terminals from the storage block 907 via corresponding circuit arrangements at the same timing. The first and second read amplifiers 937 and 938 calculate the differences between the input S and N signals, and output image signals from the output lines 939 and 940 outside the sensor chip.

An operation in the first read mode will be explained in detail with reference to FIG. 10.

Figure 10:
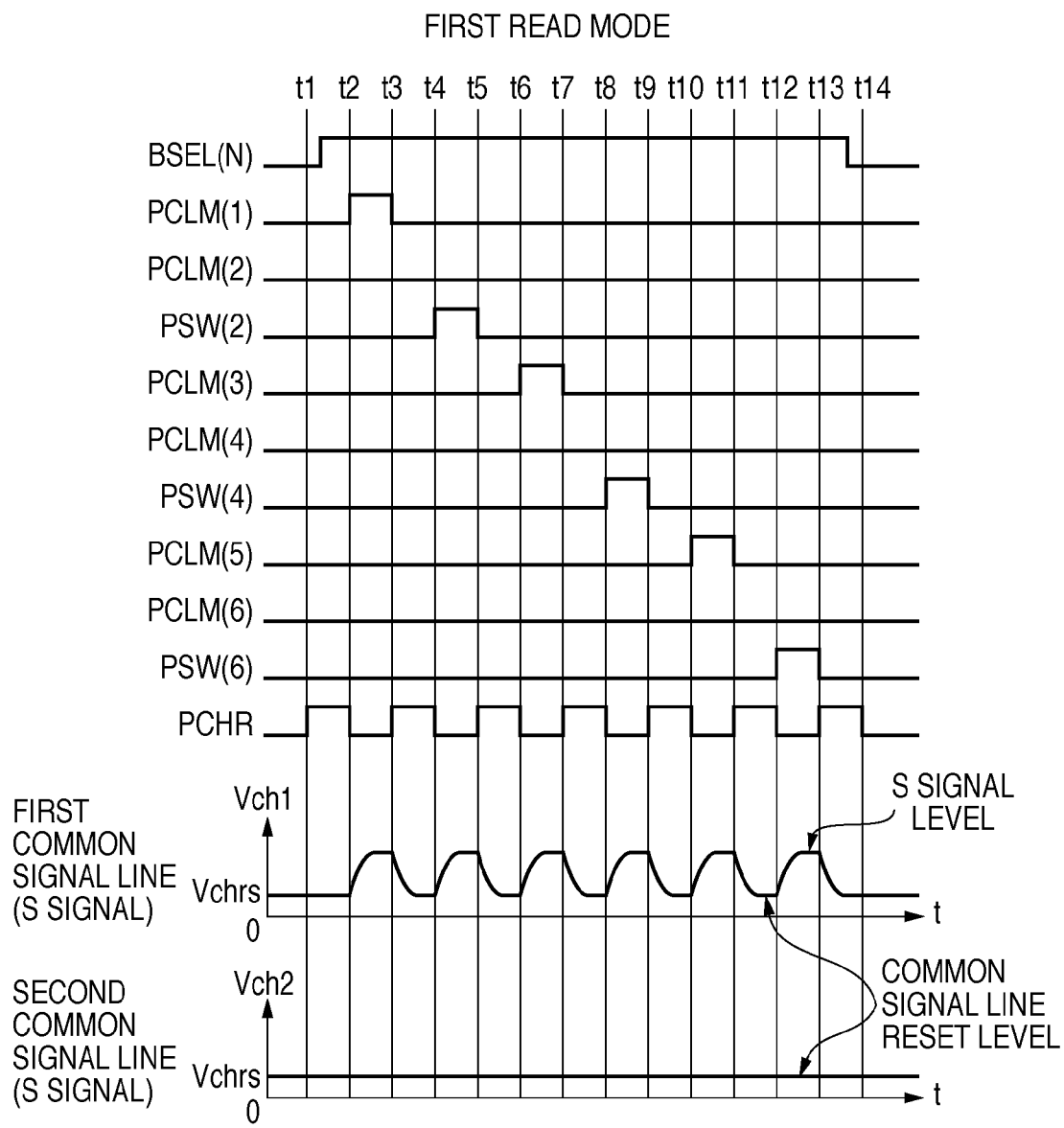
FIG. 10 is a timing chart showing an operation in the first read mode according to the third preferred embodiment of the present invention.

FIG. 10 is a timing chart of pulses for driving the respective switches shown in FIG. 9 in the first read mode. FIG. 10 also shows fluctuations of the potentials (levels) of the first and second common signal lines (S signal) 922 and 923.

In the first read mode, as shown in FIG. 10, column selection pulses PCLM(2), PCLM(4), and PCLM(6) remain at Low level to always keep each read switch of the second read switch 919 OFF.

Before timing t1, S and N signals of one row are written in the storage block 907 at predetermined timings of the pulses PTS and PTN.

Operations at timings t1 to t14 shown in FIG. 10 will be explained.

At timing t1, the pulse PCHR changes to Hi level to turn on the common signal line reset switch 936. In response to this, the levels of the first and second common signal lines 922 and 923 are reset to those of the common signal line reset voltages Vchrs and Vchrn. Also, the block selection pulse BSEL(1) for the first block changes to Hi level to connect the block common signal lines 924 and 925 for the first block to the common signal lines 922 and 923.

At timing t2, the pulse PCHR changes to Low level to electrically disconnect the first and second common signal lines 922 and 923 from the common signal line reset voltage sources Vchrs and Vchrn. The column selection pulse PCLM (1) for the first column changes to Hi level to connect a CTS(1) 901 to the first common signal line 922. The level of a signal stored in the CTS(1) 901 is output to the first common signal line 922.

More specifically, the level of the first common signal line 922 gradually changes from that of the common signal line reset voltage Vchrs to that of the S signal. At this time, the resistance component applied from the CTS(1) 901 to the first common signal line 922 is given by the sum of the resistance components of the first read switch 911 and first block selection switch 920, and the interconnection resistance of a line from the CTS(1) 901 to the first read amplifier 937.

At the same timing, an N signal is also output from the CTN(1) 901 to the first common signal line (N signal) via an corresponding circuit arrangement. The level of the first common signal line (N signal) gradually changes from that of the common signal line reset voltage Vchrn to that of the N signal.

Subsequently, the output voltage of the first read amplifier is held at a predetermined timing, obtaining the pixel signal of the first column.

At timing t3, after an output signal from the first read amplifier is obtained, the column selection pulse PCLM(1) for the first column changes to Low level. At timing t3, the level of the first common signal line 922 has reached that of the S signal of the first column. Thus, the pulse PCHR changes to Hi level to reset the level of the first common signal line 922 to that of the common signal line reset voltage Vchrs.

At timing t4 after the first common signal line 922 changes to the level of the common signal line reset voltage Vchrs, the pulse PCHR changes to Low level to electrically disconnect the first common signal line 922 from the common signal line reset voltage source Vchrs again. The column selection pulse PSW(2) for the second column changes to Hi level to connect the CTS(2) 902 and the first common signal line 922. An S signal stored in the CTS(2) 902 is output to the first common signal line 922.

That is, similar to timings t2 and t3, the level of the first common signal line 922 gradually changes from that of the common signal line reset voltage Vchrs to that of the S signal. At this time, the resistance component applied from the CTS (2) 902 to the first common signal line 922 is given by the sum of the resistance components of the third read switch 912 and first block selection switch 920, and the interconnection resistance of a line from the CTS(2) 902 to the first read amplifier 937.

At the same timing, an N signal is also output from the CTN(2) 902 to the first common signal line (N signal) via an corresponding circuit arrangement. The level of the first common signal line for the N signal gradually changes from that of the common signal line reset voltage Vchrn to that of the N signal.

Subsequently, the output voltage of the first read amplifier is held at a predetermined timing, obtaining the pixel signal of the second column.

At timing t5, after an output signal from the first read amplifier is obtained, the column selection pulse PSW(2) for the second column changes to Low level. At timing t5, the voltage of the first common signal line 922 has reached a signal-level voltage on the second column. Hence, the pulse PCHR changes to Hi level to reset the level of the first common signal line 922 again to that of the common signal line reset voltage.

Similarly, the pixel signals of the third and fourth columns are output during the period between timings t5 and t9, and those of the fifth and sixth columns are output during the period between timings t9 and t13. In this manner, pixel signals of one block in one row selected by a vertical scanning circuit 101 can be obtained during the period between timings t1 and t13.

At timing t13, after the pixel signals of one block are output, the block selection pulse BSEL(1) for the first block changes to Low level to electrically disconnect the block common signal line for the first block from the common signal line.

After that, the block selection pulse BSEL(2) for the second block (not shown) and the block selection pulse BSEL(3) for the third block (not shown) are driven, obtaining pixel signals of one row selected by the vertical scanning circuit 101. Note that the operations at t1 to t13 in FIG. 10 are executed at each of intervals between timings T1, T2, T3, and T4 in FIG. 12 (e.g., an interval between T1 and T2).

Figure 12:
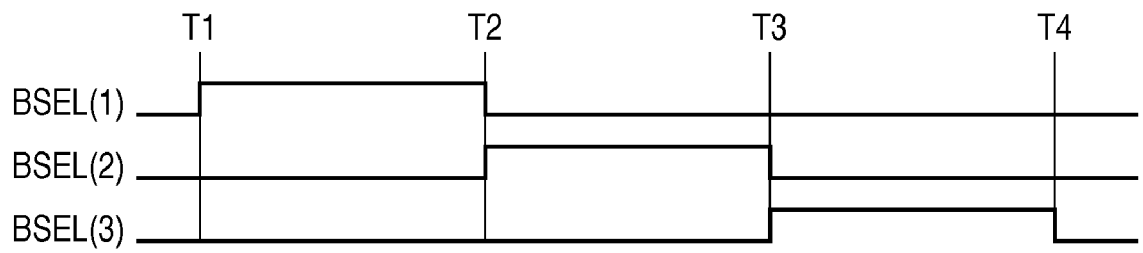
FIG. 12 is a timing chart showing the operation in the second read mode according to the third preferred embodiment of the present invention.

In the third embodiment, pixels of six rows are arranged in the vertical direction. To read out all pixel signals, the operations at timings T1 to T4 shown in FIG. 12 are repeated six times.

As described above, in the first read mode, the resistance component applied from the storage block 907 to the read amplifier 937 is as follows. When reading out a pixel signal from an odd-numbered column, the resistance component is given by the sum of the resistance components of the first read switch 911 and first block selection switch 920, and the interconnection resistance of a line from the storage block 907 to the first read amplifier 937. When reading out a pixel signal from an even-numbered column, the resistance component is given by the sum of the resistance components of the third read switch 915 and first block selection switch 920, and the interconnection resistance of a line from the storage block 907 to the first read amplifier 937.

The parasitic capacitance generated on a line extending from the storage block 907 to the first read amplifier 937 is as follows. When reading out a pixel signal from an odd-numbered column, the parasitic capacitance is given by the sum of the capacitive component of the dummy switch 926 of the first dummy circuit 927 connected between the storage block 907 and the first read switch 911, and the capacitive component of the third read switch (OFF) 915. When reading out a pixel signal from an even-numbered column, the parasitic capacitance is given by the sum of the capacitive component of the first read switch (OFF) 911 and the capacitive component of the second read switch (OFF) 919.

The gate lengths, gate widths, and electrical characteristics of the respective switches are equal to each other. Thus, a signal delay when reading out a pixel signal from an odd-numbered column and a signal delay when reading out a pixel signal from an even-numbered column become equal to each other.

The second read mode will be explained in detail with reference to FIGS. 11 and 12.

Figure 11:
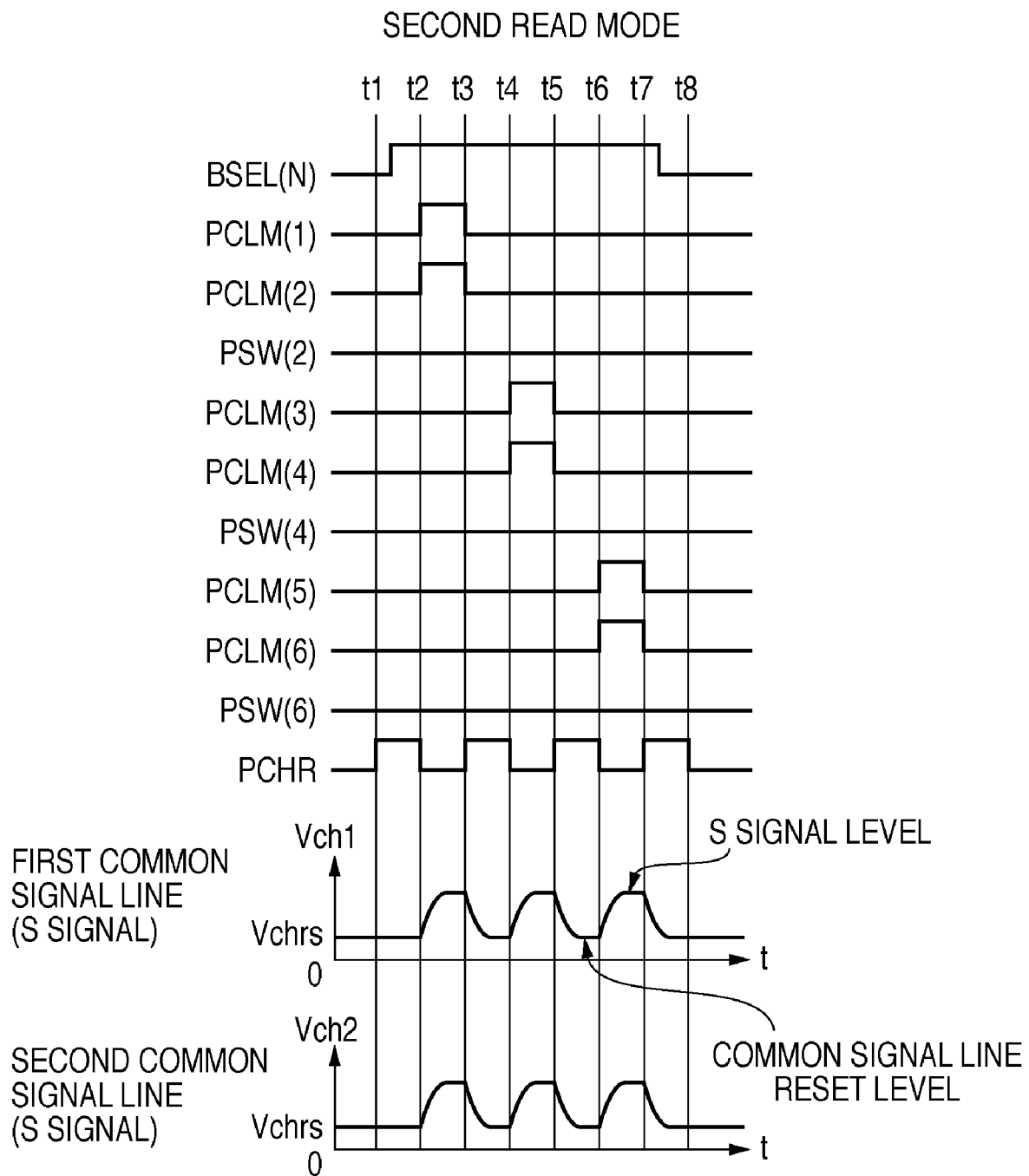
FIG. 11 is a timing chart showing an operation in the second read mode according to the third preferred embodiment of the present invention.

FIG. 11 is a timing chart of pulses for driving the respective switches shown in FIG. 9 in the second read mode. FIG. 11 also shows fluctuations of the potentials of the first and second common signal lines (S signal) 922 and 923.

In the second read mode, as shown in FIG. 11, the column selection pulses PSW(2), PSW(4), and PSW(6) remain at Low level in order to always keep each read switch of the third read switch 915 OFF.

Before timing t1, S and N signals of one row are written in the storage block 907 at predetermined timings of the pulses PTS and PTN. Operations at timings t1 to t8 shown in FIG. 11 will be explained.

At timing t1, the pulse PCHR changes to Hi level to turn on the common signal line reset switch 936. The levels of the first and second common signal lines 922 and 923 are reset to those of the common signal line reset voltages Vchrs and Vchrn. In addition, the block selection pulse BSEL(1) for the first block changes to Hi level to connect the block common signal lines 924 and 925 for the first block to the common signal lines.

At timing t2, the pulse PCHR changes to Low level to electrically disconnect the first and second common signal lines 922 and 923 from the common signal line reset voltage sources Vchrs and Vchrn.

The column selection pulse PCLM(1) for the first column and the column selection pulse PCLM(2) for the second column change to Hi level to connect the CTS(1) 901 and CTS(2) 902 to the first and second common signal lines. The level of a signal stored in the CTS(1) 901 is output to the first common signal line 922, and the level of a signal stored in the CTS(2) 902 is output to the second common signal line 923.

That is, the levels of the first and second common signal lines 922 and 923 gradually change from that of the common signal line reset voltage Vchrs to that of the S signal. At this time, the resistance component applied from the CTS(1) 901 to the first common signal line 922 is given by the sum of the resistance components of the first read switch 908 and first block selection switch 920, and the interconnection resistance of a line from the CTS(1) 901 to the first read amplifier 937. The resistance component applied from the CTS(2) 902 to the second common signal line 923 is given by the sum of the resistance components of the second read switch 916 and second block selection switch 921, and the interconnection resistance of a line from the CTS(2) 902 to the second read amplifier 938.

At the same timing, N signals are also output from the CTN(1) and CTN(2) to the first common signal line (N signal) via corresponding circuit arrangements. The levels of the first and second common signal lines (N signal) gradually change from that of the common signal line reset voltage Vchrn to that of the N signal.

Subsequently, the output voltages of the first and second read amplifiers are held at a predetermined timing to simultaneously obtain the pixel signals of the first and second columns.

That is, when the photoelectric conversion device is driven at the same operating frequency, a pixel signal can be obtained at a double frame rate in the second read mode, compared to the first read mode.

At timing t3 after output signals from the first and second read amplifiers are obtained, the column selection pulse PCLM(1) for the first column and the column selection pulse PCLM(2) for the second column change to Low level. At timing t3, the levels of the first and second common signal lines 922 and 923 have reached those of S signals on the first and second columns. Thus, the pulse PCHR changes to Hi level to reset the levels of the first and second common signal lines 922 and 923 to that of the common signal line reset voltage Vchrs.

Similarly, the pixel signals of the third and fourth columns are output during the period between timings t3 and t5, and those of the fifth and sixth columns are output during the period between timings t5 and t7. Accordingly, pixel signals of one block in one row selected by the vertical scanning circuit 101 can be obtained.

At timing t7, after the pixel signals of one block are output, the block selection pulse BSEL(1) for the first block changes to Low level to electrically disconnect the block common signal line for the first block from the common signal line.

At timings shown in FIG. 12, the block selection pulse BSEL(2) for the second block and the block selection pulse BSEL(3) for the third block are driven, obtaining pixel signals of one row selected by the vertical scanning circuit 101. Note that the operations at t1 to t8 in FIG. 11 are executed at each of intervals between timings T1, T2, T3, and T4 in FIG. 12.

In the third embodiment, pixels of six rows are arranged in the vertical direction. To read out all pixel signals, the operations at timings T1 to T4 shown in FIG. 12 are repeated six times.

As described above, in the second read mode, the resistance component applied from the storage block 907 to the read amplifier 937 is as follows. When reading out a pixel signal from an odd-numbered column, the resistance component is given by the sum of the resistance components of the first read switch 911 and first block selection switch 920, and the interconnection resistance of a line from the storage block 907 to the first read amplifier 937. When reading out a pixel signal from an even-numbered column, the resistance component is given by the sum of the resistance components of the second read switch 919 and second block selection switch 921, and the interconnection resistance of a line from the storage block 907 to the second read amplifier 938.

The parasitic capacitance generated on a line extending from the storage block 907 to the first and second read amplifiers 937 and 938 is as follows. When reading out a pixel signal from an odd-numbered column, the parasitic capacitance is given by the sum of the capacitive component of the dummy switch connected between the storage block 907 and the first read switch 911, and the capacitive component of the third read switch (OFF) 915. When reading out a pixel signal from an even-numbered column, the parasitic capacitance is given by the sum of the capacitive component of the third read switch (OFF) 915 and the capacitive component of the dummy switch connected between the second read switch 919 and the second block common signal line 925.

The gate lengths, gate widths, and electrical characteristics of the respective switches are equal to each other. Thus, a signal delay when reading out a pixel signal from an odd-numbered column and that when reading out a pixel signal from an even-numbered column become equal to each other in both the first and second read modes.

Accordingly, when reading out signals output to the first and second common signal lines, the offsets of the two outputs can be reduced, reducing a streak in the image.

(Imaging System)

Figure 13:
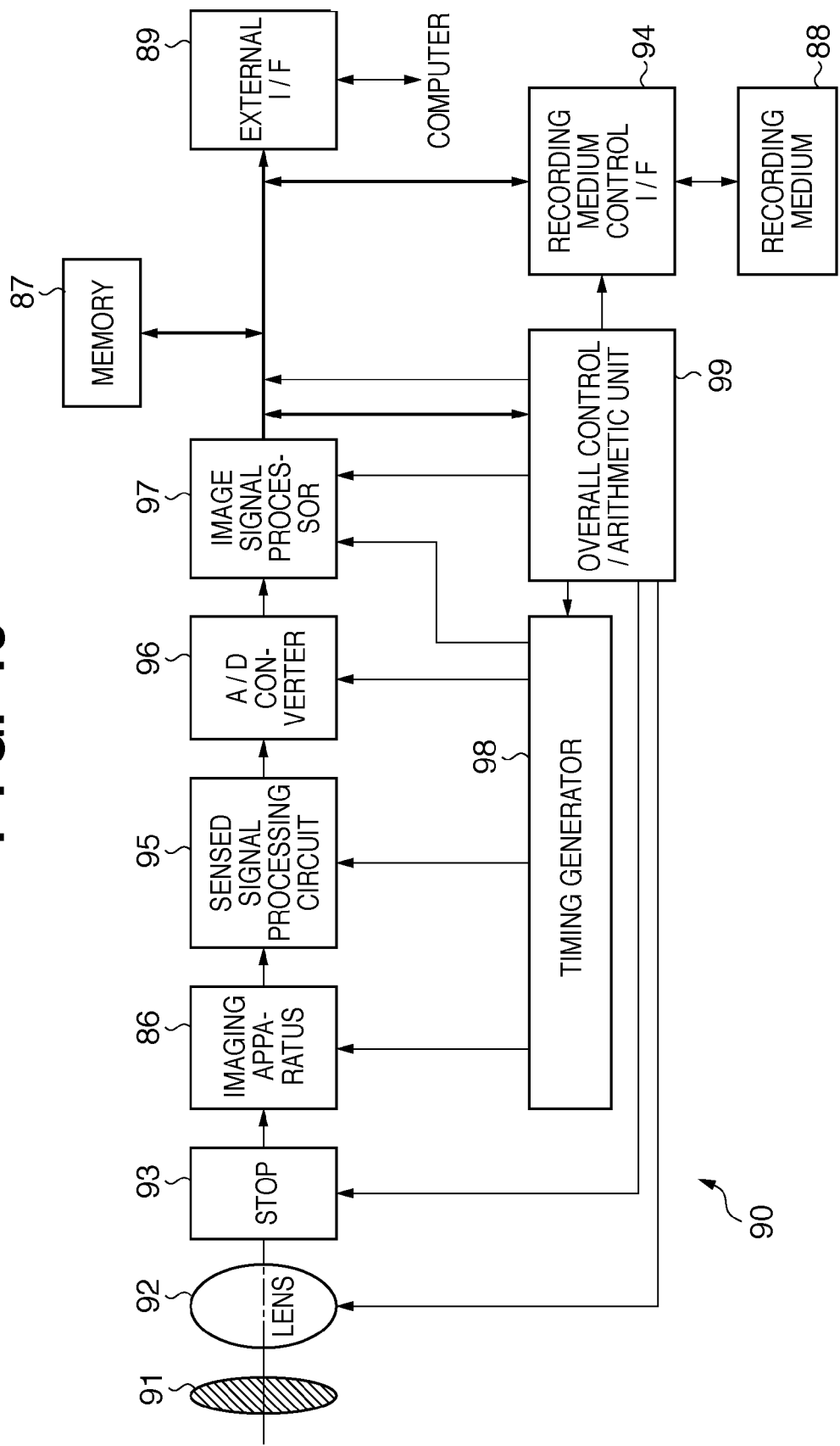
FIG. 13 is a block diagram showing an example of an imaging system to which a photoelectric conversion device according to a preferred embodiment of the present invention is applied.

FIG. 13 shows an example of an imaging system to which the photoelectric conversion device according to the present invention is applied.

As shown in FIG. 13, an imaging system 90 mainly includes an optical system, imaging apparatus 86, and signal processing unit. The optical system mainly includes a shutter 91, lens 92, and stop 93. The imaging apparatus 86 includes a photoelectric conversion device 100 according to a preferred embodiment of the present invention. The signal processing unit mainly includes a sensed signal processing circuit 95, A/D converter 96, image signal processor 97, memory 87, external I/F 89, timing generator 98, overall control/arithmetic unit 99, recording medium 88, and recording medium control I/F 94. The signal processing unit may not include the recording medium 88.

The shutter 91 is arranged in front of the lens 92 on the optical path to control the exposure.

The lens 92 refracts incident light to form an object image on the imaging plane of the photoelectric conversion device in the imaging apparatus 86.

The stop 93 is interposed between the lens 92 and the photoelectric conversion device according to the preferred embodiment of the present invention on the optical path. The stop 93 adjusts the quantity of light guided to the photoelectric conversion device according to the preferred embodiment of the present invention after passing through the lens 92.

The photoelectric conversion device according to the preferred embodiment of the present invention converts an object image formed on the imaging plane into an image signal. The imaging apparatus 86 reads out the image signal from the photoelectric conversion device, and outputs it.

The sensed signal processing circuit 95 is connected to the imaging apparatus 86, and processes the image signal output from the imaging apparatus 86.

The A/D converter 96 is connected to the sensed signal processing circuit 95. The A/D converter 96 converts the processed image signal (analog signal) output from the sensed signal processing circuit 95 into a digital signal.

The image signal processor 97 is connected to the A/D converter 96. The image signal processor 97 performs various arithmetic processes such as correction for an image signal (digital signal) output from the A/D converter 96, generating image data. The image signal processor 97 supplies the image data to the memory 87, external I/F 89, overall control/arithmetic unit 99, recording medium control I/F 94, and the like.

The memory 87 is connected to the image signal processor 97, and stores image data output from the image signal processor 97.

The external I/F 89 is connected to the image signal processor 97. Image data output from the image signal processor 97 is transferred to an external device (e.g., a personal computer) via the external I/F 89.

The timing generator 98 is connected to the imaging apparatus 86, sensed signal processing circuit 95, A/D converter 96, and image signal processor 97. The timing generator 98 supplies timing signals to the imaging apparatus 86, sensed signal processing circuit 95, A/D converter 96, and image signal processor 97. The imaging apparatus 86, sensed signal processing circuit 95, A/D converter 96, and image signal processor 97 operate in synchronism with the timing signals.

The overall control/arithmetic unit 99 is connected to the timing generator 98, image signal processor 97, and recording medium control I/F 94, and controls all of them.

The recording medium 88 is detachably connected to the recording medium control I/F 94. Image data output from the image signal processor 97 is recorded on the recording medium 88 via the recording medium control I/F 94.

In the above-described embodiments, S signals from even-numbered columns are read out using paths for S signals from odd-numbered columns. However, the present invention can be arbitrarily modified to, for example, read out S and N signals on a single column in time series using a single path.

In addition, the present invention can be arbitrarily modified to, for example, a line sensor comprising a pixel array in which pixels are arrayed one dimensionally. In other words, the term "a matrix" recited in claims 1 and 7 of the present application also includes one-dimensional arrangement, and the term "a photoelectric conversion device" also includes a line sensor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-315211, filed Dec. 5, 2007, which is hereby incorporated by reference herein in its entirety.

What is claimed is:

1. A photoelectric conversion device comprising:
 a pixel array in which pixels are arrayed in a matrix, each pixel including a photoelectric conversion unit;
 a first storage unit and a second storage unit which store signals from different pixels of an identical row to be read out;
 a first read switch which reads out the signal stored in the first storage unit to a first common signal line;
 a second read switch which reads out the signal stored in the second storage unit to a second common signal line; and
 a third read switch which has an input terminal electrically connected to an input terminal of the second read switch, and which has an output terminal electrically connected to an output terminal of the first read switch, and which reads out the signal stored in the second storage unit to the first common signal line.

2. The device according to claim 1, wherein a resistance component of a line connecting the first storage unit and the first common signal line, a resistance component of a line connecting the second storage unit and the first common signal line, and a resistance component of a line connecting the second storage unit and the second common signal line are equivalent to each other.

3. The device according to claim 2, wherein electrical characteristics of the first read switch, the second read switch, and the third read switch are equivalent to each other.

4. The device according to claim 1, wherein the third read switch is configured to change between a mode in which a signal stored in the first storage unit and a signal stored in the second storage unit are read out to the first common signal line at different timings, and a mode in which a pixel signal stored in the first storage unit is read out to the first common signal line and a pixel signal stored in the second storage unit is read out to the second common signal line.

5. The device according to claim 1, wherein the third read switch is configured to change between a mode in which a signal stored in the second storage unit is read out to the second common signal line, and a mode in which a signal stored in the second storage unit is read out to both the first common signal line and the second common signal line.

6. The device according to claim 1, further comprising:
 a first dummy circuit which is electrically connected between the first storage unit and the first read switch; and
 a second dummy circuit which is electrically connected between the second read switch and the second common signal line,
 wherein electrical characteristics of the first dummy circuit and the second dummy circuit are equivalent to each other.

7. A photoelectric conversion device comprising:
 a pixel array in which pixels are arrayed in a matrix, each pixel including a photoelectric conversion unit;
 a signal output circuit which outputs a signal read out from the pixel array;
 a first common signal line; and
 a second common signal line,
 the signal output circuit including a plurality of read blocks,
 each of the read blocks including
  a plurality of storing units including first and second storing units, the plurality of storing units arranged to store signals from different pixels of an identical row to be read out,
  a first block common signal line to which signals are output from the plurality of first storage units,
  a second block common signal line to which signals are output from the plurality of second storage units,
  a plurality of first read switches which read out the signals stored in the first storage units to the first block common signal line,
  a plurality of second read switches which read out the signals stored in the second storage units to the second common signal line,
  a plurality of third read switches, each of which has an input terminal electrically connected to an input terminal of a corresponding one of the second read switch, and each of which has an output terminal electrically connected to the first block common signal line, and each of which reads out the signal stored in the second storage unit to the first block common signal line,
  a first block selection switch which reads out a signal passing through the first block common signal line to the first common signal line, and
  a second block selection switch which reads out a signal passing through the second block common signal line to the second common signal line.

8. An imaging apparatus comprising:
 a photoelectric conversion device according to claim 1;
 an optical system which forms an image on an imaging plane of the photoelectric conversion device; and
 a signal processing unit which processes a signal output from the photoelectric conversion device to generate image data.

* * * * *